US012596929B2

(12) United States Patent
Lan et al.

(10) Patent No.: US 12,596,929 B2
(45) Date of Patent: Apr. 7, 2026

(54) INTEGRATED CIRCUIT WITH DYNAMIC FUSING OF NEURAL NETWORK BRANCH STRUCTURES BY TOPOLOGICAL SEQUENCING

(71) Applicant: Cambricon Technologies Corporation Limited, Beijing (CN)

(72) Inventors: Huiying Lan, Beijing (CN); Ruitao Wang, Beijing (CN); Haizhao Luo, Beijing (CN); Bo Cao, Beijing (CN); Xunyu Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 405 days.

(21) Appl. No.: 18/003,685

(22) PCT Filed: Dec. 25, 2021

(86) PCT No.: PCT/CN2021/141393
§ 371 (c)(1),
(2) Date: Dec. 28, 2022

(87) PCT Pub. No.: WO2022/135599
PCT Pub. Date: Jun. 30, 2022

(65) Prior Publication Data
US 2024/0289617 A1     Aug. 29, 2024

(30) Foreign Application Priority Data

Dec. 25, 2020    (CN) .......................... 202011561973.4
Dec. 25, 2020    (CN) .......................... 202011563266.9

(51) Int. Cl.
*G06N 3/082*     (2023.01)
*G06N 3/04*     (2023.01)

(52) U.S. Cl.
CPC .............. *G06N 3/082* (2013.01); *G06N 3/04* (2013.01)

(58) Field of Classification Search
None
See application file for complete search history.

(56) References Cited

FOREIGN PATENT DOCUMENTS

CN     109754073 A     5/2019
CN     110462640 A     11/2019
(Continued)

OTHER PUBLICATIONS

Anonymous Authors, A Simple Method to Reduce Off-chip Memory Accesses on Convolutional Neural Networks; arXiv: 1901.09614v1 [cs.NE] Jan. 28, 2019; Total pp. 9 (Year: 2019).*
(Continued)

*Primary Examiner* — Alan Chen
(74) *Attorney, Agent, or Firm* — Getech Law LLC; Jun Ye

(57) ABSTRACT

The present disclosure relates to an apparatus and a method for dynamically fusing a branch structure of a neural network according to a fusion policy, a board card, and a readable storage medium. The computing apparatus of the present disclosure is included in an integrated circuit apparatus. The integrated circuit apparatus includes a general interconnection interface and other processing apparatus. The computing apparatus interacts with other processing apparatus to jointly complete a computing operation specified by a user. The integrated circuit apparatus further includes a storage apparatus. The storage apparatus is connected to the computing apparatus and other processing apparatus, respectively. The storage apparatus is used.

11 Claims, 26 Drawing Sheets

(56) References Cited

FOREIGN PATENT DOCUMENTS

| CN | 110490309 | A | 11/2019 |
|----|-----------|---|---------|
| CN | 110543890 | A | 12/2019 |

OTHER PUBLICATIONS

He et al., Deep Residual Learning for Image Recognition; arXiv:1512.03385v1 [cs.CV] Dec. 10, 2015; Total pp. 12 (Year: 2015).*

Chen et al., TVM: End-to-End Optimization Stack for Deep Learning; arXiv:1802.04799v1 [cs.LG] Feb. 12, 2018; Total pp. 19 (Year: 2018).*

Chi et al., Prime: A Novel Processing-in-memory Architecture for Neural Network Computation in ReRAM-based Main Memory; 2016 ACM/IEEE 43rd Annual International Symposium on Computer Architecture; Total pp. 13 (Year: 2016).*

CN202011561973.4—First Office Action mailed on Feb. 27, 2025, 18 pages.

Chen et al., "Deep Learning Processor Architecture", AI Computing Systems, Intelligent Computing System, China Machine Press, Feb. 29, 2020, 42 pages.

CN202011563266.9 - First Office Action mailed on Apr. 1, 2025, 16 pages.

* cited by examiner

1201"

Select a starting layer according to a fusion policy

1202"

Check rules of the fusion policy to create a template fuse unit

1203"

Derive a shape of the template fuse unit

1204"

Derive an address

1205"

Allocate on-chip storage space

1206"

Generate an executable instruction

20

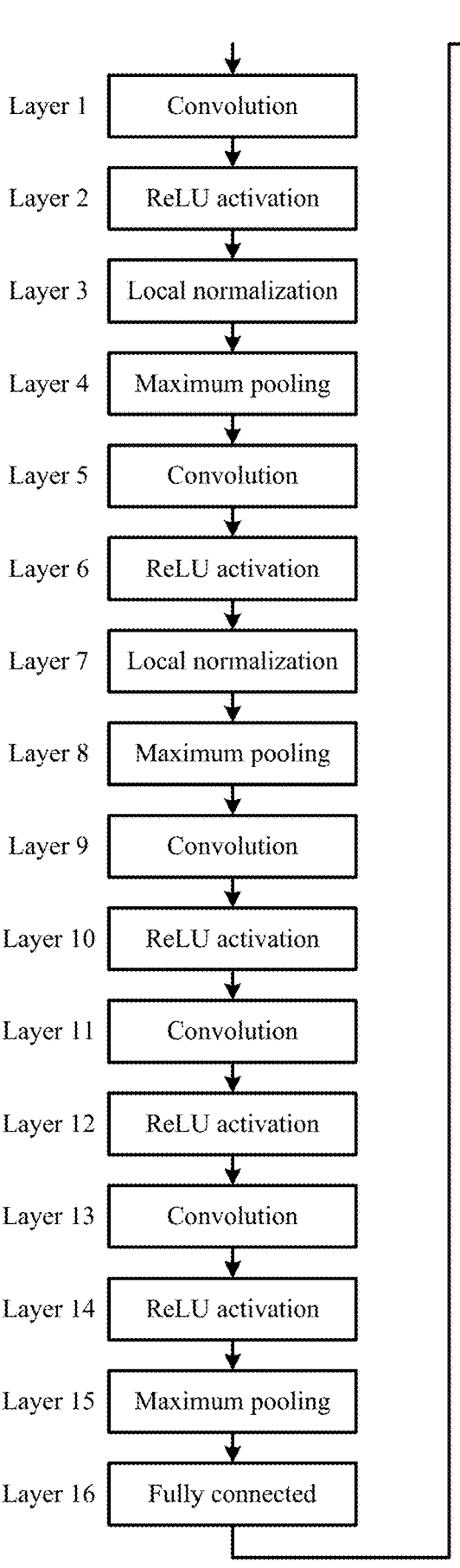
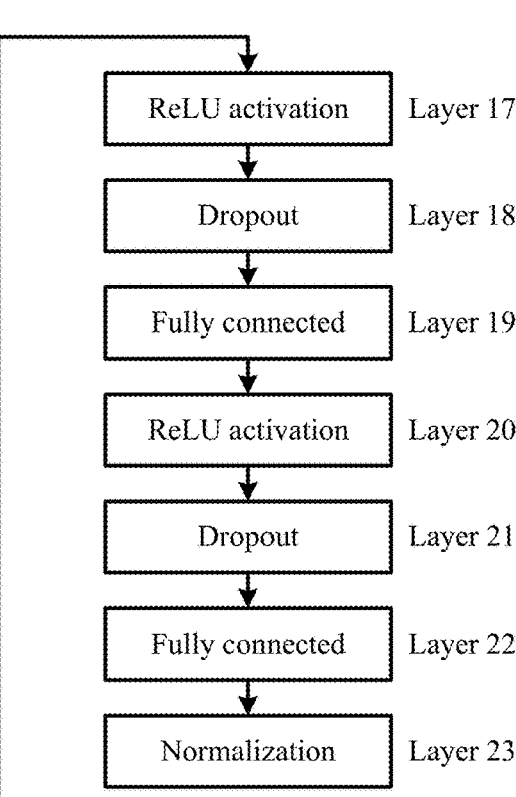

| | |
|---|---|
| Layer 1 | Convolution |
| Layer 2 | ReLU activation |
| Layer 3 | Local normalization |
| Layer 4 | Maximum pooling |
| Layer 5 | Convolution |
| Layer 6 | ReLU activation |
| Layer 7 | Local normalization |
| Layer 8 | Maximum pooling |
| Layer 9 | Convolution |
| Layer 10 | ReLU activation |
| Layer 11 | Convolution |
| Layer 12 | ReLU activation |
| Layer 13 | Convolution |
| Layer 14 | ReLU activation |
| Layer 15 | Maximum pooling |
| Layer 16 | Fully connected |

| | |
|---|---|
| ReLU activation | Layer 17 |
| Dropout | Layer 18 |
| Fully connected | Layer 19 |
| ReLU activation | Layer 20 |
| Dropout | Layer 21 |
| Fully connected | Layer 22 |
| Normalization | Layer 23 |

Select a starting layer according to a fusion policy                          1201

Create a template fuse unit based on the starting layer                       1202

Perform neural network computing according to the template fuse unit created  1203

INTEGRATED CIRCUIT WITH DYNAMIC FUSING OF NEURAL NETWORK BRANCH STRUCTURES BY TOPOLOGICAL SEQUENCING

CROSS REFERENCE OF RELATED APPLICATIONS

The present application is a 371 of international Application PCT/CN2021/141393, filed Dec. 25, 2021, which claims priority to: Chinese Patent Application No. 2020115619734 with the title of "Apparatus and Method for Fusing Branch Structures, Board Card, and Readable Storage Medium" filed on Dec. 25, 2020; Chinese Patent Application No. 2020115632669 with the title of "Apparatus and Method for Fusing Neural Network, Board Card, and Readable Storage Medium" filed on Dec. 25, 2020. The contents of the aforementioned applications are incorporated herein by reference in their entireties.

TECHNICAL FIELD

The present disclosure generally relates to a neural network field. More specifically, the present disclosure relates to an apparatus and a method for dynamically fusing a branch structure of a neural network according to a fusion policy, a board card, and a readable storage medium.

BACKGROUND

A neural network is composed of a plurality of neuron systems connected according to certain rules. Roughly, the neural network is composed of following four kinds of layers: an input layer, a convolution layer, a pooling layer, and a fully connected layer.

The input layer is configured to truncate part of information from input data and convert the part of information into a feature matrix for presentation, where the feature matrix contains features corresponding to the part of information. The convolution layer is configured to receive the feature matrix from the input layer and perform feature extraction on the input data through a convolution operation. The convolution layer may be a multi-layer convolution layer in practice. The pooling layer is configured to replace a certain area of data with a value. This value is usually a maximum value or an average value of all values in the area. By pooling, on the premise of not losing too much information, a size of a model may be reduced, and computing speed may be improved. The fully connected layer plays the role of a classifier in the whole convolution neural network, which is equivalent to feature space conversion. In the fully connected layer, all useful information in previous layers may be extracted and integrated, and the information may be compared based on different categories to judge whether the input data is similar to comparison objects.

With the development of technology, the number of layers of the neural network is increasing, and the structure of the neural network is becoming more and more complex. Nowadays, many neural network models with branch structures have been developed, such as a ResNet model. When computing, a model with a branch structure consumes a lot of resources and delays operation time.

Therefore, a mechanism to reduce input/output accesses of a branch structure of a neural network model is urgently required in the field of artificial intelligence.

SUMMARY

In order to at least partly solve technical problems mentioned in BACKGROUND, a solution of the present disclosure provides an apparatus and a method for dynamically fusing a branch structure of a neural network according to a fusion policy, a board card, and a readable storage medium.

A first aspect of the present disclosure discloses an integrated circuit apparatus for dynamically fusing a branch structure of a neural network according to a fusion policy. The integrated circuit apparatus includes a processing apparatus and a computing apparatus. The processing apparatus is configured to create a topological sequence according to the branch structure, perform a fusion based on a starting layer of the topological sequence, and check rules of the fusion policy to create a template fuse unit. The computing apparatus is configured to perform neural network computing according to the template fuse unit.

A second aspect of the present disclosure discloses a board card, including the integrated circuit apparatus.

A third aspect of the present disclosure discloses a method for dynamically fusing a branch structure of a neural network according to a fusion policy. The method includes: creating a topological sequence according to the branch structure; performing a fusion based on a starting layer of the topological sequence and checking rules of the fusion policy to create a template fuse unit; and performing neural network computing according to the template fuse unit.

A fourth aspect of the present disclosure discloses a computer readable storage medium, on which computer program codes for dynamically fusing a branch structure of a neural network according to a fusion policy are stored. When the computer program codes are run by a processing apparatus, the method is performed.

The present disclosure fuses the branch structure to generate the template fuse unit. An input of a top layer and an output of a last layer in the template fuse unit are used as interactive data between the template fuse unit and an off-chip memory. During this period, computing of each layer does not require accesses to the off-chip memory, which greatly reduces on-chip and off-chip input/output access frequency.

BRIEF DESCRIPTION OF DRAWINGS

By reading the following detailed description with reference to drawings, the above and other objects, features and technical effects of exemplary implementations of the present disclosure will become easier to understand. In the drawings, several implementations of the present disclosure are shown in an exemplary manner rather than a restrictive manner, and the same or corresponding reference numerals indicate the same or corresponding parts.

FIG. 6A is a schematic diagram of an AlexNet model.

FIG. 8B is a schematic diagram that two convolution layers are fused together according to an embodiment of the present disclosure.

DETAILED DESCRIPTION

Figure 1:
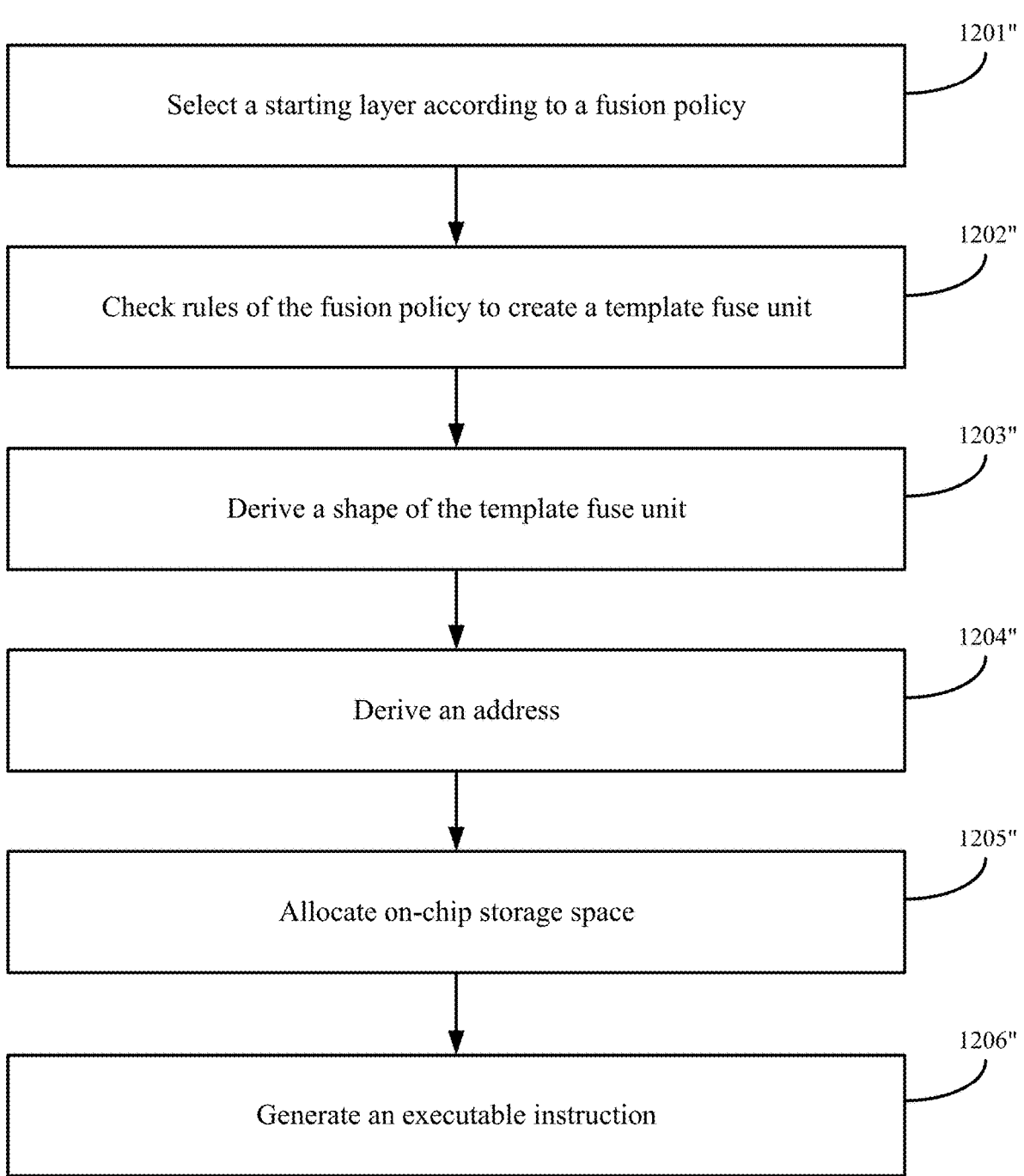
FIG. 1 is a structural diagram of a board card according to an embodiment of the present disclosure.

Technical solutions in embodiments of the present disclosure will be described clearly and completely hereinafter with reference to drawings in the embodiments of the present disclosure.

Obviously, embodiments to be described are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" in the claims, the specification, and the drawings of the present disclosure are used for distinguishing different objects rather than describing a specific order. Terms such as "including" and "comprising" used in the specification and the claims of the present disclosure indicate the presence of a feature, an entity, a step, an operation, an element, and/or a component, but do not exclude the existence or addition of one or more other features, entities, steps, operations, elements, components, and/or collections thereof.

It should also be understood that terms used in the specification of the present disclosure are merely for a purpose of describing a particular embodiment rather than limiting the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims of the present disclosure refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context.

Specific implementations of the present disclosure will be described in detail in combination with drawings below.

A neural network is composed of an input layer, a convolution layer, an activation function, a pooling layer, and a fully connected layer, with several layers at least and hundreds of layers at most. Each layer performs an operator. For example, the convolution layer performs a convolution operator, and how many operators are required to be performed as there are how many layers. In the present disclosure, when a particular layer is mentioned, the layer refers to an operator corresponding to the layer.

When neural network computing is performed, input information and an output result of each layer of a model are different for each inference computing and are viewed as variable data. The variable data is generally represented by a feature map (matrix). In the present disclosure, input information of the whole neural network model and an input map of each layer of the model are collectively called a feature map. Once the feature map is loaded onto an on-chip memory component, the feature map is referred as an on-chip unit map in the present disclosure. Parameters for training a network model usually do not change frequently after the training is stabilized, or the parameters are compiled and generated after a network topology structure and hardware parameters are determined. The parameters do not change in the computing process, so the parameters may be viewed as constant data. The constant data includes but is not limited to a weight, a bias, a device hardware instruction, a mean and a variance of batchnorm, and the like. In the present disclosure, the weight is used to represent all constant data uniformly. However, when "data" is mentioned in the present disclosure, the "data" generally refers to a map structure that allows operations corresponding to operators to be fused together in the neural network model according to a fusion policy. Variable data and constant data involved in the map structure are feature maps plus corresponding weights.

FIG. 1 is a schematic structural diagram of a board card 10 according to an embodiment of the present disclosure. As shown in FIG. 1, the board card 10 includes a chip 101, which is a system on chip (SoC), or called an on-chip system, and integrates one or a plurality of combined processing apparatuses. The combined processing apparatus is an artificial intelligence operation unit, which is used to support various deep learning algorithms and various machine learning algorithms and meet requirements for intelligent processing in complex scenarios in computer vision, speech, natural language processing, data mining, and other fields. In particular, deep learning technology is widely applied in the field of cloud intelligence. A notable feature of cloud intelligence applications is a large amount of input data, which has high requirements for storage capacity and computing power of a platform. The board card 10 of this embodiment is suitable for cloud intelligent applications. The board card 10 of this embodiment has huge off-chip storage, huge on-chip storage, and a lot of computing power.

The chip 101 is connected to an external device 103 through an external interface apparatus 102. The external device 103 may be, for example, a server, a computer, a camera, a monitor, a mouse, a keyboard, a network card, or a WIFI interface. To-be-processed data is transferred from the external device 103 to the chip 101 through the external interface apparatus 102. A computing result of the chip 101 may be sent back to the external device 103 through the external interface apparatus 102. According to different application scenarios, the external interface apparatus 102 may have different interface forms, such as a peripheral component interconnect express (PCIe) interface.

The board card 10 further includes a storage component 104 used for storing data. The storage component 104 includes one or a plurality of storage units 105. The storage component 104 is connected to and transfers data to a control component 106 and the chip 101 through a bus. The control component 106 in the board card 10 is configured to regulate and control a state of the chip 101. As such, in an application scenario, the control component 106 may include a micro controller unit (MCU).

Figure 2:
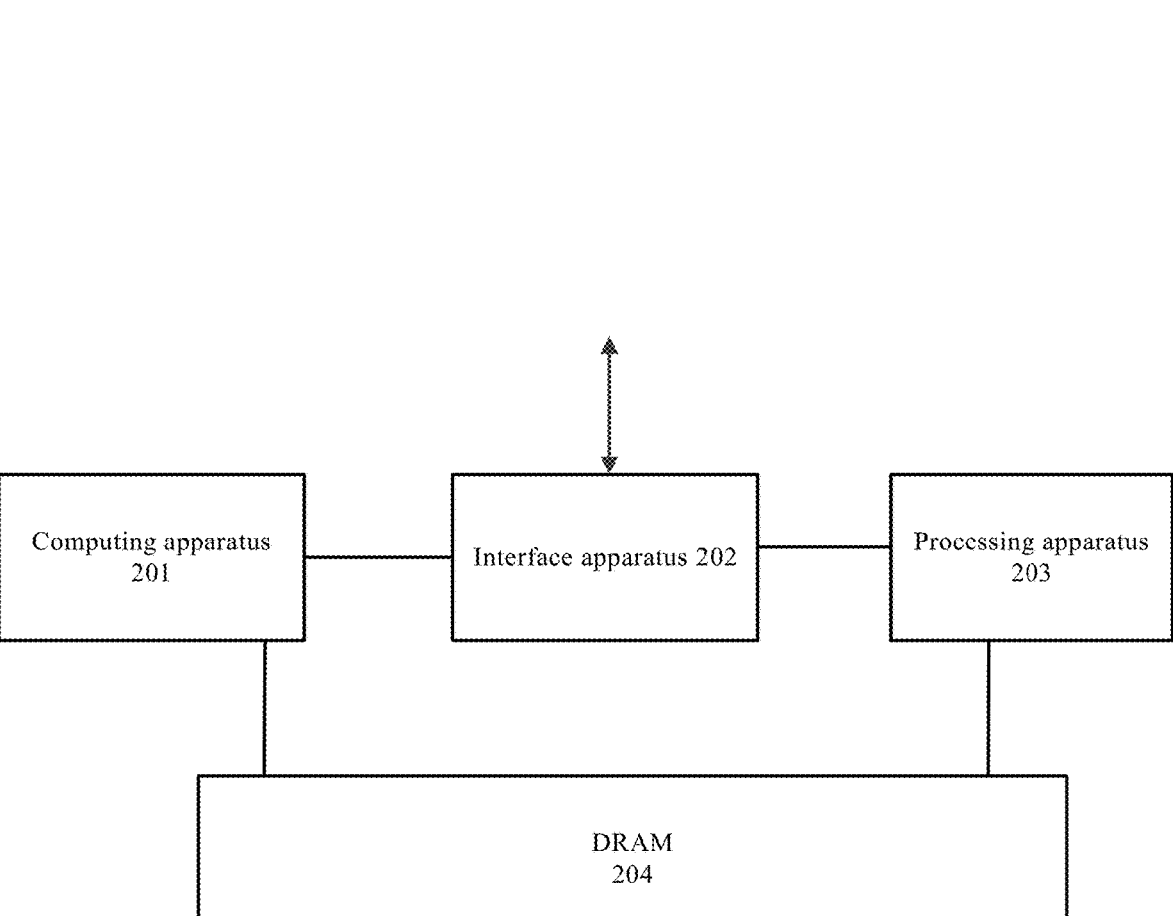
FIG. 2 is a structural diagram of an integrated circuit apparatus according to an embodiment of the present disclosure.

FIG. 2 is a structural diagram of a combined processing apparatus in the chip 101 of this embodiment. As shown in FIG. 2, the combined processing apparatus 20 includes a computing apparatus 201, an interface apparatus 202, a processing apparatus 203, and a dynamic random access memory (DRAM) 204.

The computing apparatus 201 is configured to perform an operation specified by a user. The computing apparatus 201 is mainly implemented as a single-core intelligent processor or a multi-core intelligent processor. The computing apparatus 201 is used for performing deep learning computing or machine learning computing. The computing apparatus 201 interacts with the processing apparatus 203 through the interface apparatus 202 to jointly complete the operation specified by the user.

The interface apparatus 202 is used to transfer data and control instructions between the computing apparatus 201 and the processing apparatus 203. For example, the computing apparatus 201 may acquire input data from the processing apparatus 203 via the interface apparatus 202 and write the input data to an on-chip storage apparatus of the computing apparatus 201. Further, the computing apparatus 201 may acquire the control instructions from the processing apparatus 203 via the interface apparatus 202 and write the control instructions to an on-chip control cache of the computing apparatus 201. Alternatively or optionally, the interface apparatus 202 may further read data in the storage apparatus of the computing apparatus 201 and then transfer the data to the processing apparatus 203.

The processing apparatus 203 serves as a general processing apparatus and performs basic controls that include but are not limited to moving data, starting and/or stopping the computing apparatus 201. According to different implementations, the processing apparatus 203 may be a central processing unit (CPU), a graphics processing unit (GPU), or one or more types of other general and/or dedicated processors. These processors include but are not limited to a digital signal processor (DSP), an application specific integrated circuit (ASIC), a field-programmable gate array (FPGA), or other programmable logic components, discrete gate or transistor logic components, discrete hardware components, and the like. Moreover, the number of the processors may be determined according to actual requirements. As described above, with respect to the computing apparatus 201 of the present disclosure only, the computing apparatus 201 of the present disclosure may be viewed as having a single-core structure or an isomorphic multi-core structure. However, when considered together, the computing apparatus 201 and the processing apparatus 203 are viewed as forming a heterogeneous multi-core structure.

The DRAM 204 is used for storing to-be-processed data. The DRAM 204 is a double data rate (DDR) memory with a size of 16G or more than 16G generally. The DRAM 204 is used for saving data of the computing apparatus 201 and/or the processing apparatus 203.

Figure 3:
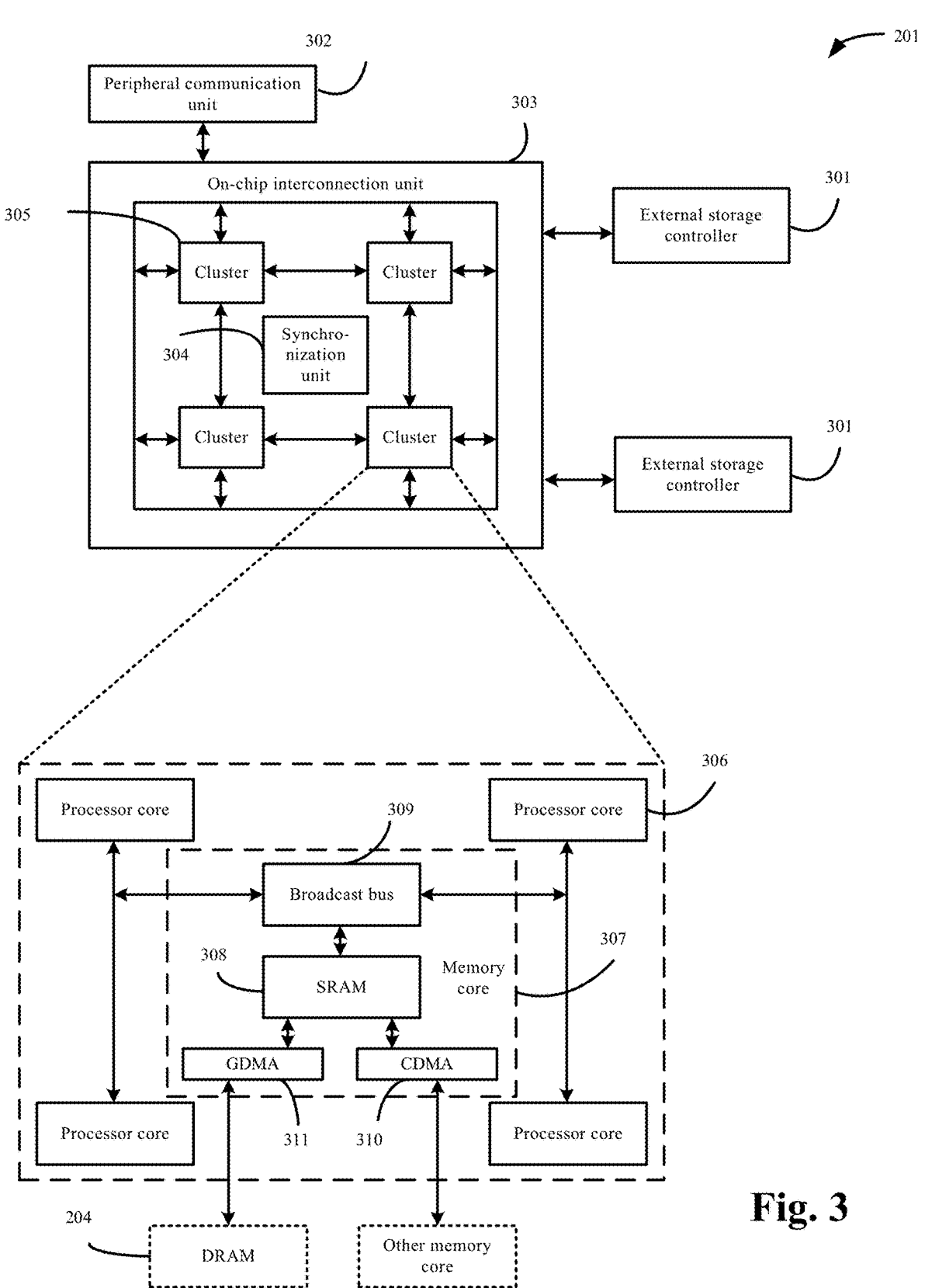
FIG. 3 is a schematic diagram of an internal structure of a computing apparatus according to an embodiment of the present disclosure.

FIG. 3 is a schematic diagram of an internal structure of the computing apparatus 201. The computing apparatus 201 is used for processing input data in computer vision, speech, natural language, and data mining. The computing apparatus 201 in the figure is designed in a multi-core hierarchical structure. The computing apparatus 201 serves as an on-chip system. The computing apparatus 201 includes a plurality of clusters. Each cluster further includes a plurality of processor cores. In other words, the computing apparatus 201 is composed of an on-chip system-cluster-processor core hierarchy.

In terms of a hierarchy of the on-chip system, as shown in FIG. 3, the computing apparatus 201 includes an external storage controller 301, a peripheral communication unit 302, an on-chip interconnection unit 303, a synchronization unit 304, and a plurality of clusters 305.

There may be a plurality of external storage controllers 301, two of which are illustrated in the figure. The external storage controller is used to, in response to access requests from the processor cores, access an external storage device, such as the DRAM 204 in FIG. 2, thereby reading data from off-chip or writing data to off-chip. The peripheral communication unit 302 is used to receive a control signal from the processing apparatus 203 through the interface apparatus 202 and start the computing apparatus 201 to perform a task. The on-chip interconnection unit 303 connects the external storage controller 301, the peripheral communication unit 302, and the plurality of clusters 305. The on-chip interconnection unit 303 is used to transfer data and control signals between units. The synchronization unit 304 is a global barrier controller (GBC). The synchronization unit 304 is used to coordinate a work progress of each cluster and ensure synchronization of information. The plurality of clusters 305 are computing cores of the computing apparatus 201, four of which are illustrated in the figure. With the development of hardware, the computing apparatus 201 of the present disclosure may further include 8, 16, 64, or even more clusters 305. The clusters 305 are used to efficiently perform deep learning algorithms.

In terms of a hierarchy of the clusters, as shown in FIG. 3, each cluster 305 includes a plurality of processor cores (IPU cores) 306 and a memory core (MEM core) 307.

Figure 4:
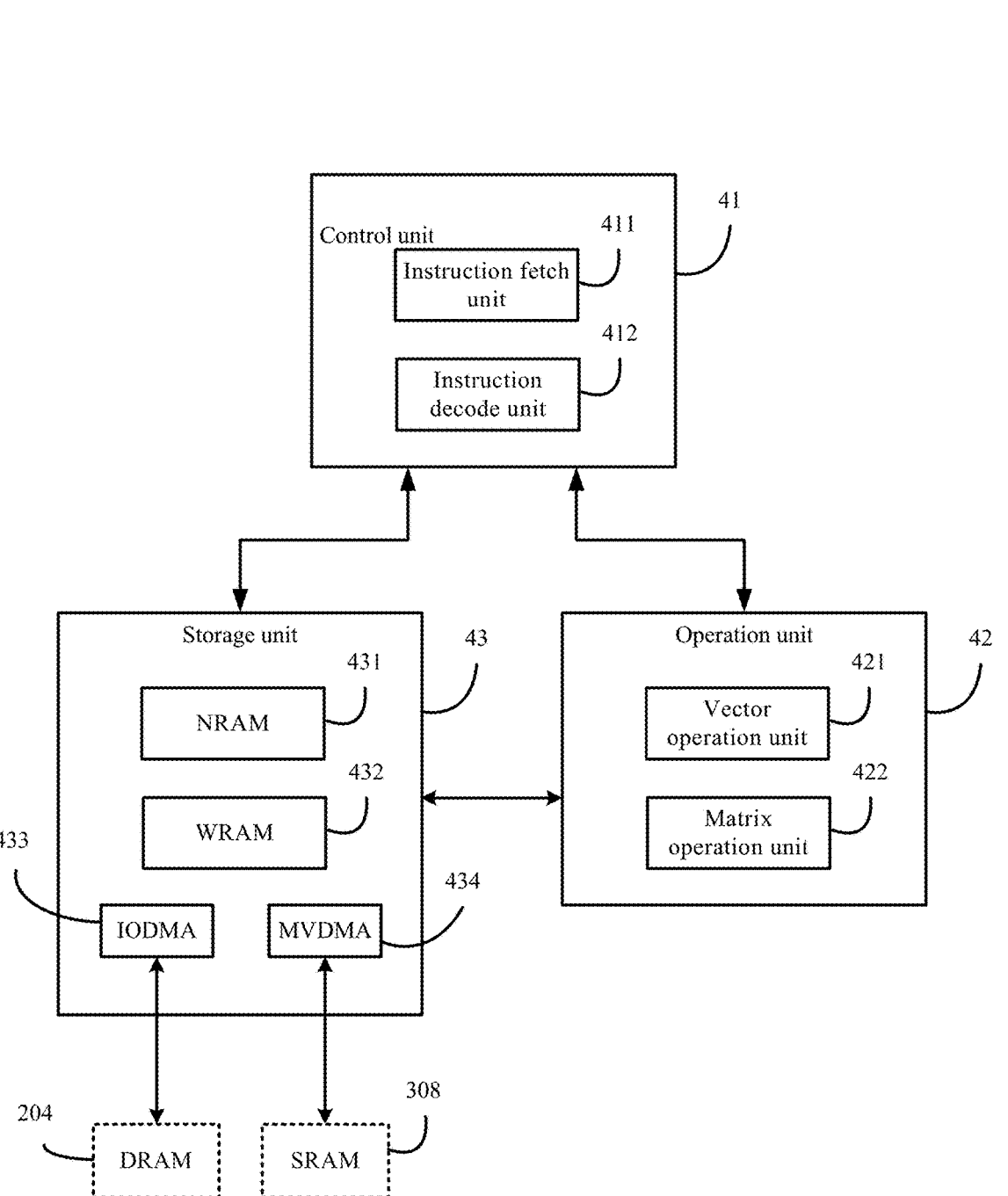
FIG. 4 is a schematic diagram of an internal structure of a processor core according to an embodiment of the present disclosure.

Four processor cores 306 are illustrated in the figure. The present disclosure does not limit the number of the processor cores 306. An internal architecture of a processor core is shown in FIG. 4. Each processor core 306 includes three units: a control unit 41, an operation unit 42, and a storage unit 43.

The control unit 41 is used for coordinating and controlling work of the operation unit 42 and the storage unit 43 to complete a deep learning task. The control unit 41 includes an instruction fetch unit (IFU) 411 and an instruction decode unit (IDU) 412. The instruction fetch unit 411 is used for acquiring an instruction from the processing apparatus 203. The instruction decode unit 412 is used for decoding the instruction acquired and sending a decoding result as control information to the operation unit 42 and the storage unit 43.

The operation unit 42 includes a vector operation unit 421 and a matrix operation unit 422. The vector operation unit 421 is used for performing a vector operation and supports complex operations, such as vector multiplication, addition, and nonlinear conversion. The matrix operation unit 422 is responsible for core computing of deep learning algorithms, which includes matrix multiplication and convolution.

The storage unit 43 is used for storing or moving related data. The storage unit 43 includes a neuron storage unit (neuron random access memory (RAM), NRAM) 431, a weight storage unit (weight RAM, WRAM) 432, an input/output direct memory access unit (input/output direct memory access, IODMA) 433, and a move direct memory access unit (move direct memory access, MVDMA) 434. The NRAM 431 is used for storing a feature map for computing by the processor cores 306 and an intermediate result after the computing. The WRAM 432 is used for storing a weight of a deep learning network. The IODMA 433 controls memory accesses of the NRAM 431/the WRAM 432 and the DRAM 204 through a broadcast bus 309. The MVDMA 434 is used for controlling memory accesses of the NRAM 431/the WRAM 432 and a shared storage unit (shared RAM, SRAM) 308.

Going back to FIG. 3, the memory core 307 is mainly used for storage and communication. In other words, the memory core 307 is mainly used for storing shared data or intermediate results between the processor cores 306 and performing communication between the clusters 305 and the DRAM 204, communication between the clusters 305, and communication between the processor cores 306. In other embodiments, the memory core 307 is able to perform a scalar operation and is used for performing the scalar operation.

The memory core 307 includes the SRAM 308, the broadcast bus 309, a cluster direct memory access unit (cluster direct memory access, CDMA) 310, and a global direct memory access unit (global direct memory access, GDMA) 311. The SRAM 308 plays the role of a high-performance data transfer station. Data reused among different processor cores 306 in the same cluster 305 is not required to be acquired from the DRAM 204 separately through the processor cores 306. Instead, the data is transferred among the processor cores 306 through the SRAM 308. The memory core 307 is only required to quickly distribute the reused data from the SRAM 308 to the plurality of processor cores 306, so as to improve inter-core communication efficiency and greatly reduce on-chip and off-chip input/output accesses.

The broadcast bus 309, the CDMA 310, and the GDMA 311 are used for performing the communication between the processor cores 306, the communication between the clusters 305, and data transfer between the clusters 305 and the DRAM 204, respectively. The above will be explained separately below.

The broadcast bus 309 is used for completing high-speed communication between the processor cores 306 in the clusters 305. The broadcast bus 309 of this embodiment supports inter-core communication modes including unicast, multicast, and broadcast. The unicast refers to point-to-point (single processor core-to-single processor core) data transfer. The multicast refers to a communication mode for transferring one copy of data from the SRAM 308 to a certain number of processor cores 306. The broadcast refers to a communication mode for transferring one copy of data from the SRAM 308 to all processor cores 306. The broadcast is a special case of the multicast.

Figure 5:
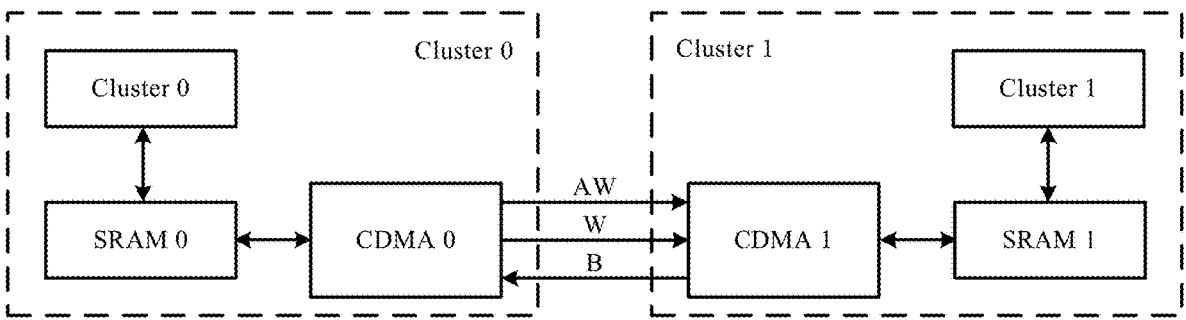
FIG. 5 is a schematic diagram that a processor core intends to write data to a processor core of another cluster.

The CDMA 310 is used for controlling memory accesses of the SRAM 308 between different clusters 305 in the same computing apparatus 201. FIG. 5 is a schematic diagram that a processor core intends to write data to a processor core of another cluster, so as to illustrate the working principle of the CDMA 310. In this application scenario, the same computing apparatus includes a plurality of clusters. For the sake of explanation, only a cluster 0 and a cluster 1 are shown in the figure. The cluster 0 and the cluster 1 include a plurality of processor cores, respectively. Similarly, for the sake of explanation, the cluster 0 in the figure shows only a processor core 0, and the cluster 1 in the figure shows only a processor core 1. The processor core 0 intends to write data to the processor core 1.

First, the processor core 0 sends a unicast write request to write the data to a local SRAM 0. A CDMA 0 serves as a master end, and a CDMA 1 serves as a slave end. The master end sends the write request to the slave end. In other words, the master end sends a write address AW and write data W and sends the data to an SRAM 1 of the cluster 1. Next, the slave end sends a write response B in response. Finally, the processor core 1 of the cluster 1 sends a unicast read request to read the data from the SRAM 1.

Going back to FIG. 3, the GDMA 311 works with the external storage controller 301. The GDMA 311 is used for controlling memory accesses from the SRAM 308 to the DRAM 204 in the clusters 305 or reading the data from the DRAM 204 to the SRAM 308 in the clusters 305. It may be known from the above that communication between the DRAM 204 and the NRAM 431 or the WRAM 432 may be implemented through two channels. A first channel is to directly connect the DRAM 204 with the NRAM 431 or the WRAM 432 through the IODAM 433. A second channel is to transfer the data between the DRAM 204 and the SRAM 308 through the GDMA 311 first, and then to transfer the data between the SRAM 308 and the NRAM 431 or the WRAM 432 through the MVDMA 434. Although it seems that the second channel requires more components and longer data flows, in fact, in some embodiments, the bandwidth of the second channel is much greater than that of the first channel. Therefore, the communication between the DRAM 204 and the NRAM 431 or the WRAM 432 may be more efficient through the second channel. The embodiment of the present disclosure may select a data transfer channel according to hardware conditions.

In other embodiments, a function of the GDMA 311 and a function of the IODMA 433 may be integrated in the same component. For the sake of description, the GDMA 311 and the IODMA 433 are viewed as different components in the present disclosure. For those skilled in the art, as long as functions and technical effects realized by the components are similar to that of the present disclosure, the components shall fall within the scope of protection of the present disclosure. Further, the function of GDMA 311, the function of IODMA 433, a function of CDMA 310, and a function of MVDMA 434 may also be implemented by the same component. Similarly, as long as functions and technical effects realized by the component are similar to the present disclosure, the component shall fall within the scope of protection of the present disclosure.

Figure 6B:
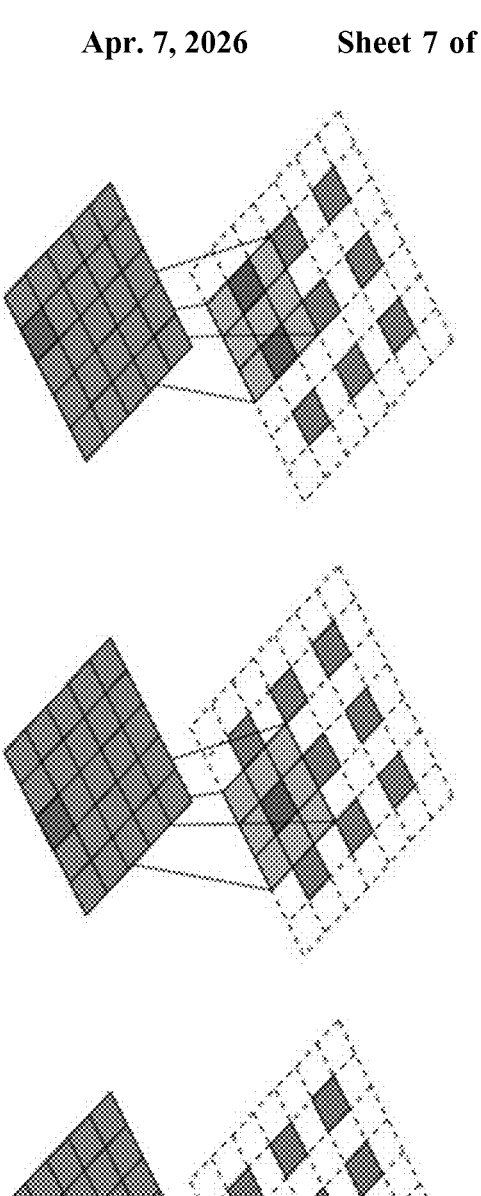
FIG. 6B is a schematic diagram of input/output feature maps in a regular pyramid structure.
Figure 6B:
Figure 6B:
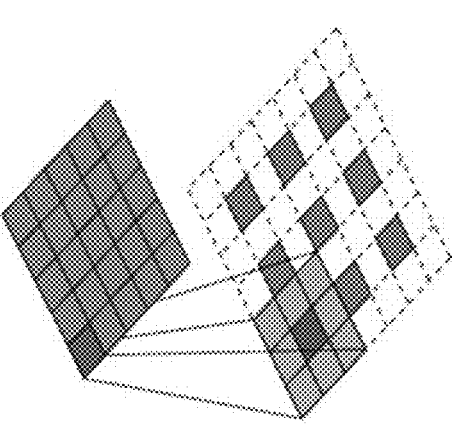
Figure 7A:
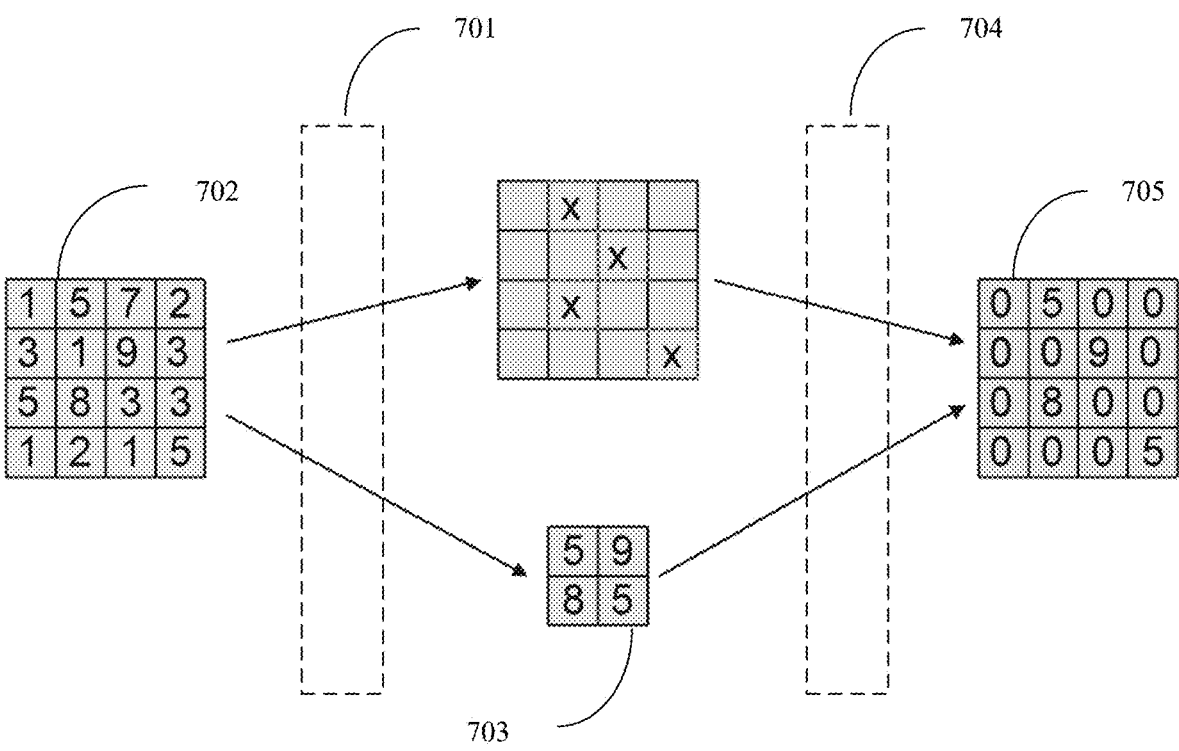
FIG. 7A is a schematic diagram of an unpooling operation of maximum pooling.
Figure 7B:
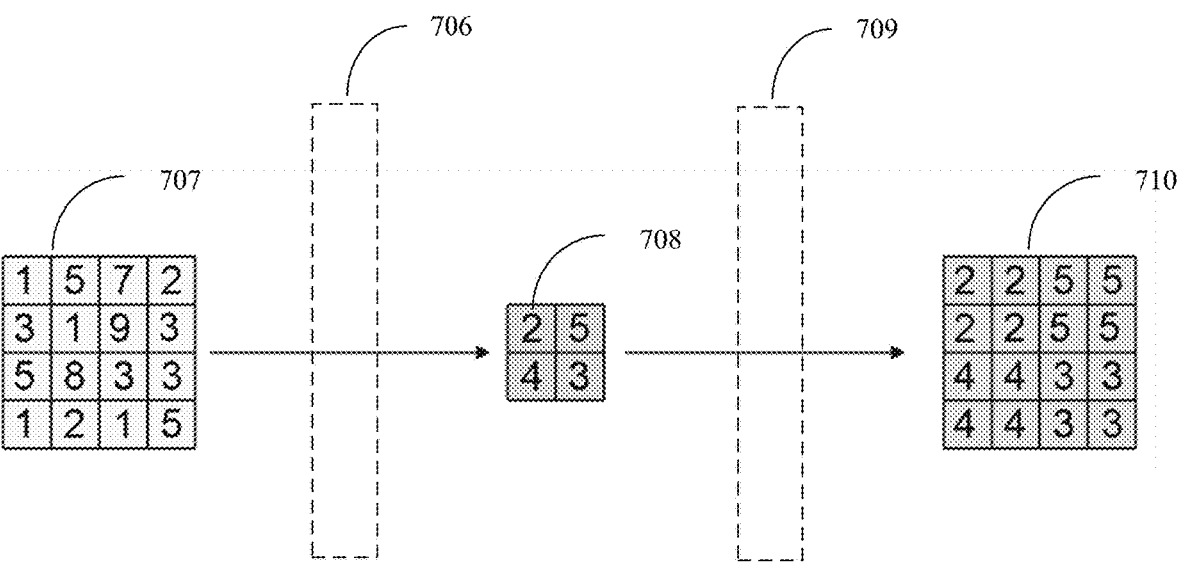
FIG. 7B is a schematic diagram of an unpooling operation of average pooling.
Figure 7C:
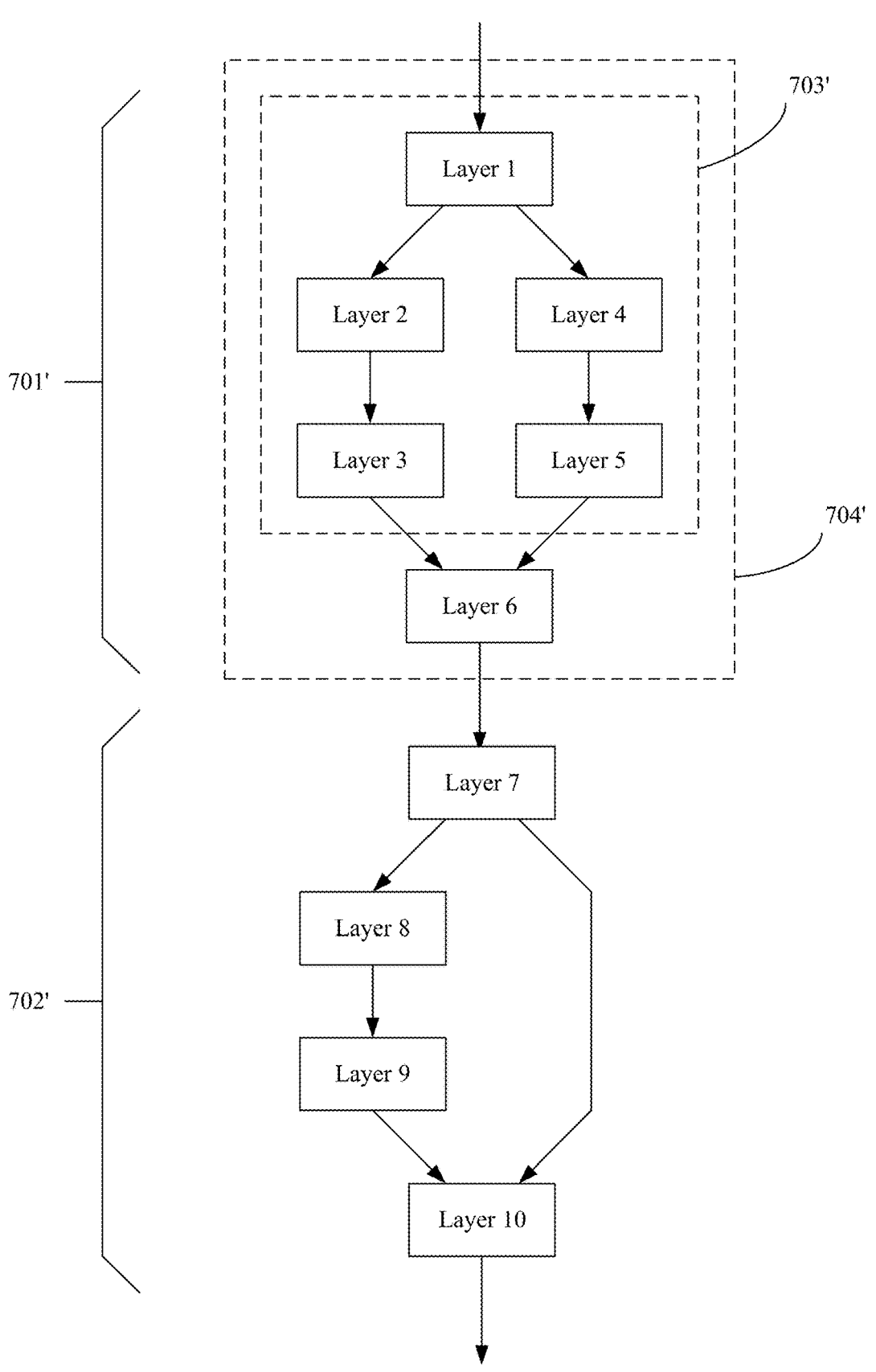
FIG. 7C is a schematic diagram of an exemplary neural network model.

Structures of a neural network model fall into two categories: a long-chain structure and a branch structure. The long-chain structure is that the neural network model is composed of layers concatenated by a single chain. Each layer has only one input and one output, and the whole is a single branch. For example, the neural network model may be a VGG16 model or an AlexNet model shown in FIG. 6A. The branch structure is that a sub-network in the neural network has only one input and one output, however, the sub-network has multiple branches. In other words, part of layers of the sub-network has a plurality of inputs or a plurality of outputs. For example, the branch structure may be a resblock structure of resnet50 and a block structure of inception_v3. As shown in FIG. 7C, the branch structure is an exemplary neural network model. This exemplary neural network model includes a sub-network 701' and a sub-network 702'. The sub-network 701' has only one input and one output and includes layers 1 to 6. Layer 1 has two outputs, and layer 6 has two inputs. Therefore, the sub-network 701' includes two branches. One branch is layer 1→layer 2→layer 3→layer 6, and another branch is layer 1→layer 4→layer 5→layer 6. The sub-network 701' constitutes one branch structure. Similarly, the sub-network 702 constitutes one branch structure.

In performing deep learning computing at each layer, a lot of off-chip and on-chip accesses are required. Especially, input data is read from the DRAM 204 to the computing apparatus 201, and then a computing result of the computing apparatus 201 is stored to the DRAM 204. This kind of frequent access consumes a lot of hardware resources. In order to solve this problem, the present disclosure fuses adjacent layers of the neural network, which reduces off-chip and on-chip data transfer to a large extent.

FIG. 8B is a schematic diagram that two convolution layers are fused together. An input of a first-layer convolution layer 810 is a 7×7 feature map 801. After this layer convolves the feature map 801 with a 3×3 kernel (which is not shown), a feature map 802 of the first-layer convolution layer 810 is obtained. A value of a 5×5 feature sub-map 804 may affect a 3×3 feature sub-map 805. Assuming that a stride is 1, after computing the 5×5 feature sub-map 804, the first-layer convolution layer 810 continues to compute a 5×5 feature sub-map 806. However, a value of the 5×5 feature sub-map 806 may affect a 3×3 feature sub-map 807.

In performing computing of a second-layer convolution layer 811, the feature map 802 becomes an input of the second-layer convolution layer 811. Similarly, after the feature map 802 is convolved with the 3×3 kernel, a feature map 803 of the second-layer convolution layer 811 is obtained. A value of the 3×3 feature sub-map 805 may affect a1×a1 feature sub-map 808 in the feature map 803. After computing the 3×3 feature sub-map 805, the second-layer convolution layer 811 continues to compute the 3×3 feature sub-map 807. However, a value of the 3×3 feature sub-map 807 may affect a1×1 feature sub-map 809 in the feature map 803.

If the layers are not fused, in performing computing of the first-layer convolution layer 810, the computing apparatus 201 reads the 5×5 feature sub-map 804 from the DRAM 204. After the computing, the computing apparatus 201 stores the 3×3 feature sub-map 805 back to the DRAM 204. Next, the computing apparatus 201 reads the 5×5 feature sub-map 806 from the DRAM 204. After the computing, the computing apparatus 201 stores the 3×3 feature sub-map 807 to the DRAM 204. In performing computing of the second-layer convolution layer 811, similarly, it is required to read the 3×3 feature sub-map 805 from the DRAM 204. After the computing, it is required to store the1×1 feature sub-map 808 to the DRAM 204. Next, it is required to read the 3×3 feature sub-map 807 from the DRAM 204. After the computing, it is required to store the 1×1 feature sub-map 809 to the DRAM 204. It may be known from the above explanation that the feature map 802, as intermediate data, is read and stored repeatedly on the chip and off the chip, which extremely occupies system resources.

If the first-layer convolution layer 810 and the second-layer convolution layer 811 are fused, which means to store the feature map 802 to the NRAM 431 (weights of the first-layer convolution layer 810 and the second-layer convolution layer 811 may also be stored in the WRAM 432), the number of times of accesses between the computing apparatus 201 and the DRAM 204 may be reduced, thereby improving execution efficiency of the whole neural network. Moreover, the feature maps (such as the feature map 801, the feature map 802, and the feature map 803) shown in FIG. 8B look like an inverted pyramid as a whole in the context of the neural network model, so the layer is called an inverted pyramid layer.

In a modern neural network model, it is not necessary that an input/output feature map of each layer is in the form of the inverted pyramid shown in FIG. 8B. Sizes of input feature maps of some layers are less than sizes of output feature maps. This kind of layer is often used in the deep learning field of computer vision. Under certain circumstances, it is required to restore a size of image to an original size for further computing. When this kind of layer is computed, the size of image is enlarged to implement an operation of mapping the image from small resolution to large resolution. FIG. 6B is a schematic diagram of this kind of layer. In combination with the principle of the inverted pyramid layer in the inverted pyramid shown in FIG. 8B, it may be known from FIG. 6B that the input/output feature maps may produce a form like a regular pyramid, so the layer is called a regular pyramid layer.

In practice, the regular pyramid layer includes a deconvolution layer, an unpooling layer, or an unsampling layer.

The deconvolution is also called transpose convolution or dilated convolution. The deconvolution is not a complete inverse of forward convolution. The deconvolution is a kind of special forward convolution. The deconvolution requires parameters for computing, while the parameters are required to be trained. The deconvolution is to enlarge a size of output image by supplementing 0 in a certain proportion first, to rotate a convolution kernel, and then to perform the forward convolution.

An unpooling operation is divided into an unpooling operation of maximum pooling and an unpooling operation of average pooling. The unpooling of maximum pooling is to reserve position information of a maximum value and then supplement 0 in other positions. As shown in FIG. 7A, a maximum pooling layer 701 is shown in the figure. An input feature map 702 of the maximum pooling layer 701 generates an output feature map 703 after passing through the maximum pooling layer 701. The figure also shows an unpooling layer 704 of maximum pooling. An input feature map 703 of the unpooling layer 704 generates an output feature map 705 after passing through the unpooling layer 704, and a size of the output feature map 705 is greater than a size of the input feature map 703. The unpooling of average pooling is to fill average values into corresponding positions in a corresponding original data area. As shown in FIG. 7B, an average pooling layer 706 is shown in the figure. An input feature map 707 of the average pooling layer 706 generates an output feature map 708 after passing through the average pooling layer 706. The figure also shows an unpooling layer 709 of average pooling. An input feature map 708 of the unpooling layer 709 generates an output feature map 710 after passing through the unpooling layer 709, and a size of the output feature map 710 is greater than a size of the input feature map 708.

Figure 8A:
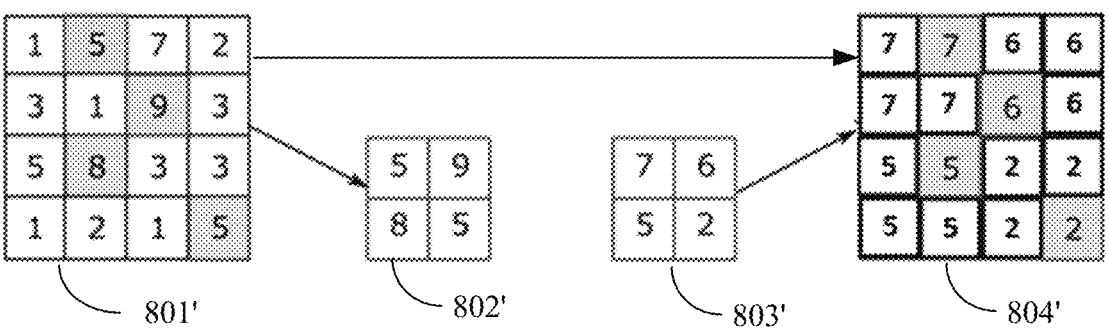
FIG. 8A is a schematic diagram of an unsampling operation.
Figure 8B:
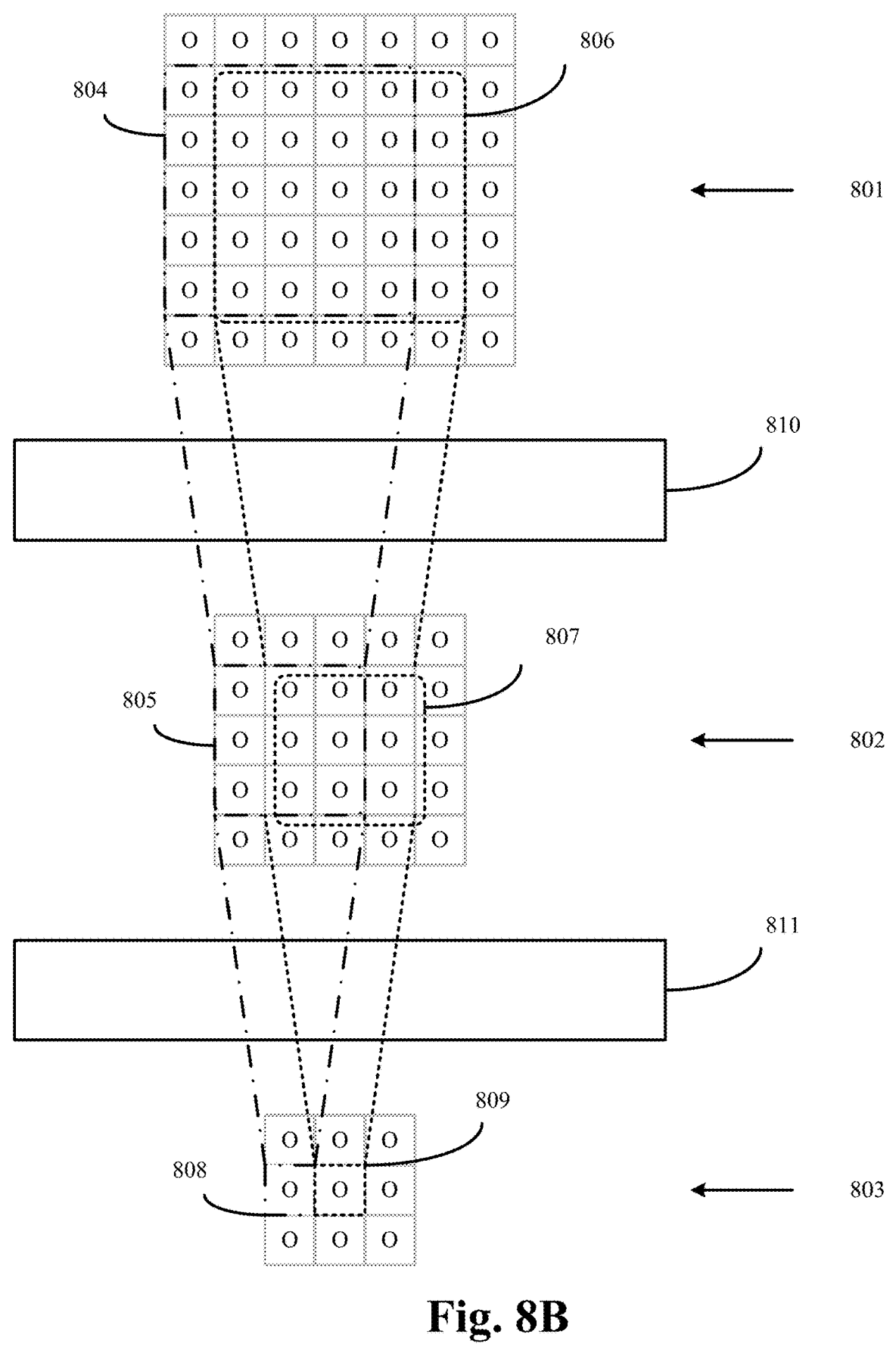

The unsampling is to directly expand a feature map according to a kernel in the corresponding original data area. FIG. 8A is a schematic diagram of the unsampling. In the figure, an input feature map 801' generates an intermediate feature map 802' after passing through a maximum pooling layer (which is not drawn). After the intermediate feature map 802' is expanded by a kernel 803' of an unsampling layer (which is not drawn), an output feature map 804' is obtained, and a size of the output feature map 804' is greater than a size of the intermediate feature map 802'.

The aforementioned operators are characterized by the fact that the input feature map is smaller than the output feature map. Additionally, there may also be a user-defined layer, which also has the characteristic that the input feature map is smaller than the output feature map.

A neural network fusion is usually a backward fusion based on a particular convolution layer and a particular pooling layer in the neural network. In other words, a starting layer of the fusion is the convolution layer or the pooling layer, and according to hardware conditions, the layer backward fuses a plurality of layers, which may contain a plurality of convolution layers and a plurality of pooling layers. However, with the development of deep learning and neural networks, the ordering of layers become complex. For example, an activation layer is set before the convolution layer, so how the activation layer is fused with the convolution layer behind should also be considered. Therefore, in addition to simply taking the convolution layer and the pooling layer as the core for fusion, the present disclosure provides various fusion methods and does not necessarily take the convolution layer and the pooling layer as the core. Instead, a specific policy is adopted to flexibly select each layer of the neural network for fusion. Even a user-defined layer may be fused as long as the layer complies with the fusion policy to optimize the overall efficiency.

Another embodiment of the present disclosure shows a new kind of fusion method, which is implemented by using hardware structures of FIG. 1, FIG. 2, FIG. 3, and FIG. 4 described above. This kind of fusion is called a template fuse unit (TFU). The template fuse unit mainly fuses a plurality of layers into one layer flexibly through a certain fusion policy to reduce input/output overheads of the network. The template fuse unit includes the neural network fusion and other fusion methods described above. The collection of these fused layers is called the template fuse unit and may be viewed as a new layer or a self-defined layer.

This embodiment loads a feature map and a weight required by the template fuse unit from the DRAM 204 to the SRAM 308 on the chip at a time. After the feature map is loaded into the SRAM 308, the feature map is called an on-chip unit map. The on-chip unit map is cut into sub-maps. One sub-map is loaded from the SRAM 308 to the NRAM 431 of the processor core 306 assigned to compute this sub-map every time, and a weight required for computing this sub-map is also loaded from the SRAM 308 to the WRAM 432. After each sub-map is computed, a corresponding intermediate result is obtained. The intermediate result is stored back to the SRAM 308. After all the sub-maps are computed, computing results are stored back to the DRAM 204 at a time. In other words, a corresponding result obtained by an operation of an operator in the neural network model by the on-chip unit map and the weight is transferred between the DRAM 204 and the SRAM 308. An output (an intermediate result) corresponding to the sub-map is transferred between the SRAM 308 and the NRAM 431. From the perspective of the computing apparatus 201, data loading of the template fuse unit is in units of on-chip unit maps, while computing of the template fuse unit is in units of sub-maps.

More specifically, the SRAM 308 is one of important reference indexes of the fusion policy. A size of space of the SRAM 308 determines whether the template fuse unit is a large map mode or a small map mode. The small map mode and the large map mode refer to whether a feature map stored in the DRAM 204 may be moved to the SRAM 308 for processing at a time. The processing apparatus 203 compares storage space required by the feature map with available space of the SRAM 308. If the space of the SRAM 308 is insufficient to accommodate the feature map, the template fuse unit is the large map mode. If the space of the SRAM 308 is large enough to accommodate the entire feature map, the template fuse unit is the small map mode. It is required to note that the on-chip unit map is just a part of the feature map in the large map mode, while, in the small map mode, if the available space of the SRAM 308 is large enough, or the feature map is small enough, the SRAM 308 may be possible to accommodate a plurality of feature maps at a time. In other words, the on-chip unit map may include the plurality of feature maps.

If the template fuse unit is the large map mode, the feature map must be split to be loaded into the computing apparatus 201. The processing apparatus 203 splits the feature map in the DRAM 204 until an on-chip unit map that is small enough is generated to meet the space requirements of the SRAM 308, so that the on-chip unit map may be moved to the SRAM 308 for processing at a time. When the feature map is split, an input-dependent operation and an output-dependent operation may be generated.

The input-dependent operation means that on-chip unit maps after splitting are at least partly overlapped, and each sub-set requires some additional copies of inputs to perform a complete operation, resulting in data redundancy in a split operation. The so-called data redundancy means that the same piece of data is reused in the system. When the template fuse unit includes a convolution layer, a pooling layer, or a matrix multiplication layer, the input-dependent operation is generated.

The output-dependent operation means that, after each sub-map generates an intermediate result, reduction is also required to obtain computing results. Reduction refers to splitting the on-chip unit map into the sub-maps to perform computing respectively based on the understanding of the content of the on-chip unit map itself, so as to reduce the scale of computing. As such, on the premise of keeping the original appearance of the on-chip unit map as much as possible, the amount of data is reduced to the maximum extent. Then, the computing results are restored or integrated based on the sub-maps. The computing results are mutually dependent during the reduction. When the template fuse unit includes an inner product layer, a convolution layer, a matrix multiplication layer, a sorting layer, and a counting layer, the output-dependent operation is generated.

Data formats of the feature map that may be processed by this embodiment include N, H, W, and C dimensions, where N represents a batch, H represents a height, W represents a width, and C represents a channel. Taking image data as an example, N represents the number of images in this batch; H represents the number of pixels of this image in the vertical direction; W represents the number of pixels of this image in the horizontal direction; and C represents the number of channels (for example, the number of channels C of a black-and-white image is 1, and the number of channels C of a red-green-blue (RGB) color image is 3).

Figure 9:
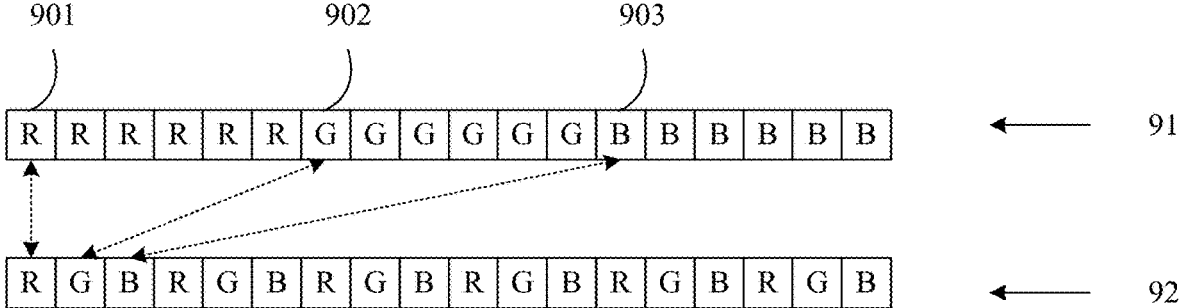
FIG. 9 is a diagram of formats of NCHW and NHWC.

The ordering of these dimensions determines how the data is composed. Common composition methods include NHWC and NCHW. FIG. 9 shows a format difference between NCHW and NHWC. This figure takes an RGB color image as an example. In this figure, R represents a red pixel, G represents a green pixel, and B represents a blue pixel. A sequence 91 is in the NCHW format. N is arranged in the outer layer. Pixels in each channel are next to each other and arranged in an RGB order. An offset of an element whose coordinates are (n, c, h, w) in storage is ((n×C+c)× H+h)×W+w. A sequence 92 is in the NHWC format. C is arranged in the innermost layer. RGB pixels of space positions corresponding to a plurality of channels are next to each other. The figure also shows positions of an input pixel 901, an input pixel 902, and an input pixel 903 in different arrangements. However, the input pixel 901, the input pixel 902, the input pixel 903 together are the color of a point in the image. A conversion method for a corresponding coordinate offset of an element whose coordinates are (n, c, h, w) is ((n×H+h)×W+w)×C+c. First, the NHWC is closer to the image data storage format of Bitmap (BMP) than the NCHW. In a file in the BMP format, data is stored pixel by pixel, and each pixel stores color values of all channels, which makes it unnecessary to perform additional dimension conversions when input images are read. Therefore, the NHWC has better memory access locality, and through every three input pixels, one output pixel is obtained. However, the NCHW obtains a final output result only after all channel inputs are ready, which requires large cache space.

Figure 10:
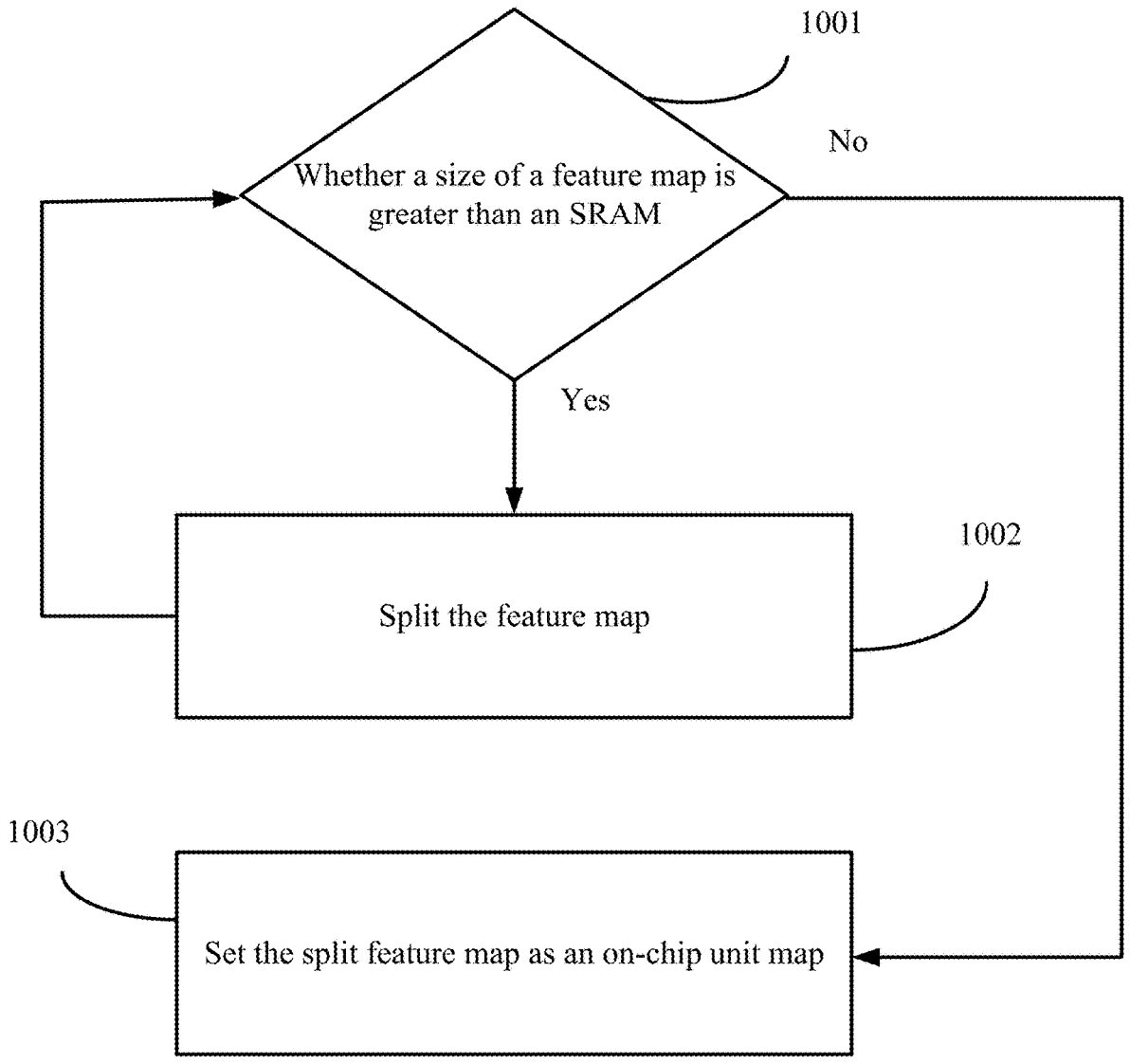
FIG. 10 is a flowchart of determining a size of an on-chip unit map according to an embodiment of the present disclosure.

This embodiment determines a size of the on-chip unit map. FIG. 10 is a corresponding flowchart.

In a step 1001, the processing apparatus 203 judges whether storage space required by a feature map is larger than available space of the SRAM 308. If the storage space required by the feature map is larger than the available space of the SRAM 308, it is represented that the feature map may not be loaded into the SRAM 308 at a time. Therefore, a step 1002 is performed to split the feature map. In this embodiment, the processing apparatus 203 chooses to split in any dimension. The processing apparatus 203 preferentially chooses to split in the N dimension because no input-dependent operation or output-dependent operation will be generated. If splitting in the N dimension fails to meet the requirements, then, splitting in the H or W dimension is considered. At this time, the input-dependent operation or the output-dependent operation may be generated. This embodiment also supports splitting in the C dimension, especially splitting along the Cout direction. As such, one convolution is split into multiple convolution by means of data optimization, so that the WRAM 432 may accommodate the weight. For example, the weight is split onto four processor cores 306. Therefore, as long as splitting in a certain dimension is processable by the computing apparatus 201, the splitting is an acceptable splitting method for this embodiment.

Further, the processing apparatus 203 may perform splitting among the N, H, and W dimensions with specific granularity in order. The specific granularity may be a fixed ratio or a variable ratio, or the specific granularity may be represented by a function. In an application scenario, the processing apparatus 203 splits the feature map or the weight in an order from large to small. Taking the feature map as an example, first, a feature map whose dimension is NHWC is split into a feature map whose dimension is $N_1HWC$ and a feature map whose dimension is $N_2HWC$ in the N dimension, where the specific granularity is the fixed ratio, and $N_1$ and $N_2$ are each half of N. If the feature map is not small enough, the processing apparatus 203 continues splitting the feature map whose dimension is $N_1HWC$ into a feature map whose dimension is $N_1H_1WC$ and a feature map whose dimension is $N_1H_2WC$ in the H dimension, where $H_1$ and $H_2$ are each half of H. If the feature map is not small enough, the processing apparatus 203 continues splitting the feature map whose dimension is $N_1H_1WC$ into a feature map whose dimension is $N_1H_1W_1C$ and a feature map whose dimension is $N_1H_1 W_2C$ in the W dimension, where $W_1$ and $W_2$ are each half of W. The processing apparatus 203 may continue splitting in the N, W, and H dimensions with smaller granularity, such as quarter, eighth, or sixteenth cuts, until the feature map is small enough and becomes an on-chip unit map that may be loaded into the SRAM 308 at a time.

It may be understood that the processing apparatus 203 may continue splitting in one dimension until the feature map may no longer be split, and then, the processing apparatus 203 selects another dimension to continue splitting. For example, the processing apparatus 203 continues splitting in the H dimension. If the feature map is split into the smallest unit, while the feature map still may not be loaded into the SRAM 308, then, the processing apparatus 203 changes to perform splitting in the W dimension until the feature map is split into the smallest unit.

It is required to note that, since such a splitting method is to split in an order from large to small, when the split feature map meets conditions, a size of storage space required by the split feature map is usually almost the same as the available space of the SRAM 308. In other words, in the large map mode, the DRAM 204 may transfer only one split feature map to the SRAM 308 every time. However, in the small map mode, the space of the SRAM 308 may load a plurality of feature maps from the DRAM 204 at a time.

After the processing apparatus 203 splits the feature map, this process goes back to the step 1001. The processing apparatus 203 judges whether the storage space required by the split feature map is still larger than the available space of the SRAM 308. If the storage space required by the split feature map is still larger than the available space of the SRAM 308, the step 1002 is performed again to continue splitting.

If the processing apparatus 203 judges that the storage space required by the split feature map is not larger than the available space of the SRAM 308, it is represented that the SRAM 308 may load the split feature map at a time. Then, a step 1003 is performed, and the processing apparatus 203 sets the split feature map as the on-chip unit map. At this point, the processing apparatus 203 determines the size of the on-chip unit map.

Further, the processing apparatus 203 determines the template fuse unit according to the size of the on-chip unit map.

Figure 11:
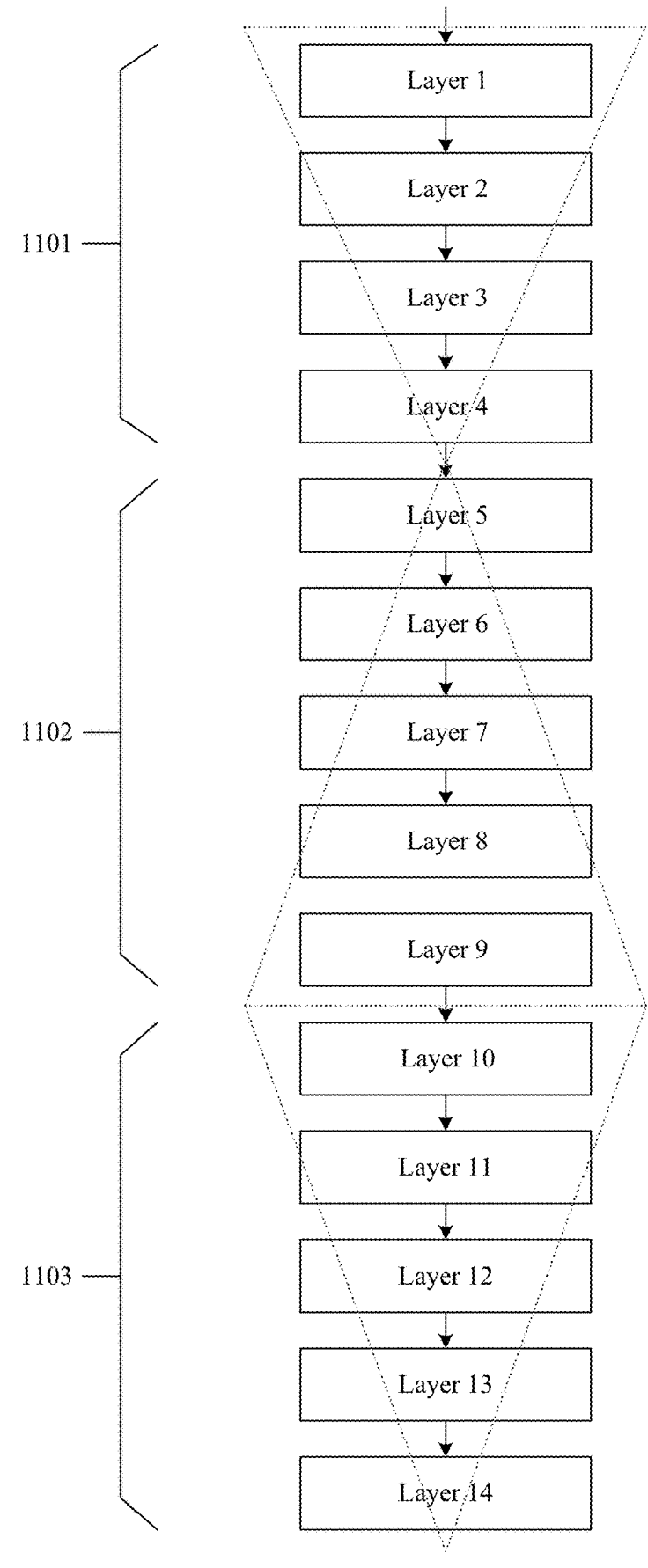
FIG. 11 is a schematic diagram of an exemplary neural network model.
Figure 12A:
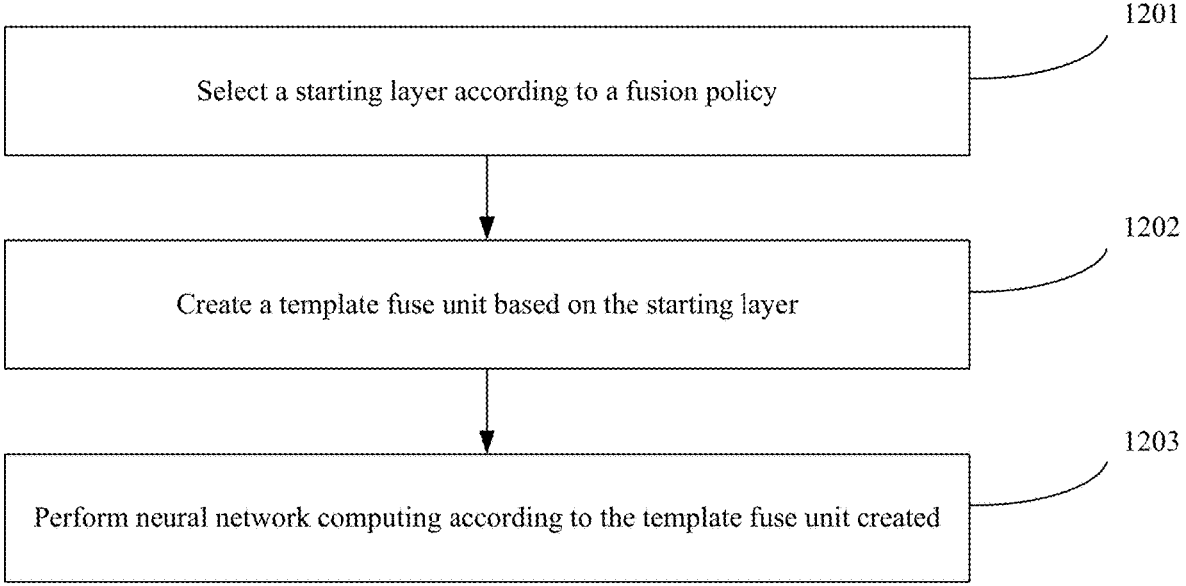
FIG. 12A is a flowchart of dynamically fusing a neural network according to a fusion policy according to an embodiment of the present disclosure.

Next, this embodiment starts to fuse each layer of the neural network as the template fuse unit. FIG. 11 shows an exemplary neural network model, which has 14 layers totally. A first section 1101 includes layers 1 to 4, which are inverted pyramid layers. A second section 1102 includes layers 5 to 9, which are regular pyramid layers. A third section 1103 includes layers 10 to 14, which are inverted pyramid layers. After the size of the on-chip unit map is determined, FIG. 12A is a flowchart of dynamically fusing a neural network according to a fusion policy in this embodiment. As shown in FIG. 12A, the flowchart includes: selecting a starting layer of a template fuse unit according to a starting rule of the fusion policy in a step 1201. The processing apparatus 203 selects the starting layer of the template fuse unit according to the starting rule of the fusion policy. In other words, the processing apparatus 203 selects a layer that starts to fuse among unfused layers in the neural network.

In an application scenario, the starting rule is that the starting layer is a top unfused layer in the neural network. The processing apparatus 203 searches for the top unfused layer. Taking an AlexNet neural network model in FIG. 6A as an example, the model has a total of 23 layers. Assuming that layers 1 to 5 are fused, when the starting rule is that the starting layer is the top unfused layer in the neural network, the processing apparatus 203 selects a ReLU activation layer of layer 6 as the starting layer and fuses backward (in other words, the processing apparatus 203 performs a fusion in the direction of layer 7). It is required to note that, under this starting rule, the starting layer is not necessarily a convolution layer or a pooling layer.

In another application scenario, considering that the convolution layer and the pooling layer consume the most input/output resources, the starting rule is that the starting layer is a top unfused convolution or pooling layer. The processing apparatus 203 first finds out all convolution and pooling layers of unfused layers in the neural network model and then starts to fuse backward from the top unfused convolution or pooling layer. Similarly, taking the AlexNet neural network model in FIG. 6A as an example, assuming that layers 1 to 9 are fused, the processing apparatus 203 finds out all the convolution and pooling layers of the unfused layers in the neural network model, which are layer 11, layer 13, and layer 15. Next, the processing apparatus 203 starts to fuse from the top unfused convolution or pooling layer. In other words, the starting layer is layer 11. Similarly, assuming that layers 1 to 3 in FIG. 11 are fused, if the starting rule is that the starting layer is the top unfused layer in the neural network, layer 4 is set as a starting layer of this template fuse unit, and a fusion is performed backward from layer 4.

In a step 1202, the fusion is performed based on the starting layer, and all rules of the fusion policy are checked one by one to create the template fuse unit. The processing apparatus 203 performs the fusion based on the starting layer and checks all the rules of the fusion policy one by one to create the template fuse unit. On the premise that all the rules are satisfied, hardware resources of the computing apparatus 201 are sufficient to load data required for computing the template fuse unit at a time and then perform neural network computing according to the template fuse unit. In addition to the starting rule, the fusion policy may also exemplarily include following rules.

Rule 1: Fusing Backward

Fusing backward is to fuse in a direction of neural network model inference starting from the starting layer. Taking FIG. 6A as an example, fusing backward is to fuse in a direction of layer 1→layer 2→layer 3. If there are unfused layers before the starting layer, under this rule, these unfused layers will not be considered to be incorporated into the template fuse unit.

Rule 2: Preferentially Fusing Forward

Fusing forward is to fuse in a reverse direction of neural network inference from the starting layer. Taking FIG. 6A as an example, fusing forward is to fuse in a direction of layer 3→layer 2→layer 1. This rule is usually matched with the starting rule that the starting layer is the top unfused convolution or pooling layer. The reason is that there may be unfused layers before the convolution or pooling layer. After selecting the starting layer, the processing apparatus 203 preferentially fuses forward to try to incorporate the unfused layers before the starting layer into the template fuse unit. Similarly, taking the AlexNet neural network model in FIG. 6A as an example, assuming that layers 1 to 2 are fused, the processing apparatus 203 founds that the top unfused convolution or pooling layer is layer 5. Therefore, the starting layer is layer 5, and the processing apparatus 203 preferentially forward fuses layer 4 and layer 3. If the fusion continues, the processing apparatus 203 backward fuses layer 6 and layer 7, and the like.

Moreover, similarly, taking the neural network model in FIG. 11 as an example, assuming that layers 1 to 2 are fused, the processing apparatus 203 founds that the top unfused convolution or pooling layer is layer 4. Therefore, the starting layer is layer 4, and the processing apparatus 203 preferentially forward fuses layer 3. If the fusion may continue, the processing apparatus 203 backward fuses layer 5 and layer 6, and the like.

Rule 3: Preferentially in Units of Branch Structures

When the neural network model has a branch structure, this rule requires that the processing apparatus 203 adds or deletes the template fuse unit preferentially in units of branch structures rather than in units of layers. If the fusion of operation logic of the whole block fails, then, a fusion from layers on each branch is considered. Taking a neural network model in FIG. 7C as an example, the processing apparatus 203 is preferentially in units of a sub-network 701' or a sub-network 702' to perform the fusion.

When the neural network is a long-chain structure, since there is no branch structure, the processing apparatus 203 adds or deletes the template fuse unit directly in units of layers. This rule is not applicable to the neural network model with the long-chain structure.

Rule 4: Single-Branch Output

The fusion policy of this embodiment does not support that the template fuse unit is a multi-output network. The reason is that shape derivation inside the template fuse unit mainly adopts a derivation form from back to front. The multi-output network means that it is required to forward derive respectively from different outputs, and results of the derivation do not necessarily come down to the same feature map, so that the results may not be converged.

In other words, the output of the template fuse unit is required to be the single-branch output, which means that a last layer of the template fuse unit may only have one output. FIG. 7C shows two fusion methods of the sub-network 701'. A first method is to fuse layers 1 to 5 into a template fuse unit 703'. A second method is to fuse layers 1 to 6 into a template fuse unit 704'. Since outputs of layer 3 and layer 5 are outputs of the template fuse unit 703', the template fuse unit 703' belongs to a multi-output network. In other words, the template fuse unit 703' has a multi-branch output. However, an output of layer 6 is an output of the template fuse unit 704', and only one piece of output data is generated. Therefore, the template fuse unit 704' belongs to a single-output network. In other words, the template fuse unit 704' has a single-branch output. The processing apparatus 203 judges whether the output of the template fuse unit is the single-branch output. If this rule is not satisfied, the processing apparatus 203 adds or deletes layers in the template fuse unit until this rule is satisfied.

Rule 5: Including at Least Two Main Layers

When layer logic is too simple, performance of the template fuse unit is even not as good as performance of the unfused layers. Therefore, when the layer logic is used as the fusion policy, the processing apparatus 203 evaluates whether an operation of each fused layer is complicated enough to enable the fusion to produce benefits. In order to produce benefits, it is required to incorporate a main layer into the template fuse unit as much as possible. The main layer refers to a layer that consumes a lot of input/output resources, such as matrix multiplication, pooling, or convolution. Here, the pooling includes various kinds of pooling, such as maximum pooling (maxpool) or average pooling (avgpool). The convolution includes various kinds of convolution, such as ordinary convolution, convolution with a mean, and depthwise convolution (depthwise conv), and the like. This rule is that the template fuse unit includes at least two main layers. When the processing apparatus 203 judges that this rule is not satisfied, the processing apparatus 203 adjusts the template fuse unit until this rule is satisfied.

Rule 6: Including a Continuous Structure in which a Main Layer, a Main Layer, and a Non-Main Layer are Successively Adjacent This rule is that the template fuse unit is required to include a continuous structure of the main layer, the main layer, and the non-main layer. In other words, the template fuse unit is required to include the continuous structure in which the main layer, the main layer, and the non-main layer are successively adjacent. Such operations are complicated enough to enable the fusion to produce benefits. With reference to layer 4-layer 5-layer 6 in FIG. 6A, where layer 4 is a maximum pooling layer, layer 5 is a convolution layer, and layer 6 is an ReLU activation layer, such a structure conforms to the continuous structure in which the main layer, the main layer, and the non-main layer are successively adjacent. Therefore, a template fuse unit including layer 4, layer 5, and layer 6 satisfies this rule. When the processing apparatus 203 judges that this rule is not satisfied, the processing apparatus 203 adjusts the template fuse unit until this rule is satisfied.

Rule 7: Including a Continuous Structure in which a Scalar Computing Layer and a Vector Computing Layer are Adjacent This rule is that the template fuse unit includes the continuous structure of the scalar computing layer and the vector computing layer. In other words, the template fuse unit includes the continuous structure in which the scalar computing layer and the vector computing layer are adjacent. The scalar computing layer refers to an addition layer, a subtraction layer, or a multiplication layer. The vector computing layer refers to an activation layer, a batch normalization layer, or a scaling layer. When the processing apparatus 203 judges that this rule is not satisfied, the processing apparatus 203 adjusts the template fuse unit until this rule is satisfied.

Rule 8: A Weight of a Convolution Layer is not an Output of a Certain Layer

This rule is that the weight of the convolution layer in the template fuse unit is not an output of any layer of the neural network, no matter whether this layer is incorporated into the template fuse unit or not. When the processing apparatus 203 judges that this rule is not satisfied, the processing apparatus 203 removes this convolution layer from the template fuse unit.

Rule 9: A Weight of a Convolution Layer is not Shared with any Layer of a Neural Network Since a weight of an operator of a neural network model involved in the template fuse unit has a special arrangement form, when a fused convolution operator shares a weight with other operators, arrangement logic of the weight will conflict. This rule is that the weight of the convolution operator in the template fuse unit is not shared with any layer of the neural network. When the processing apparatus 203 judges that this rule is not satisfied, the processing apparatus 203 removes this convolution operator from the template fuse unit.

Rule 10: A Weight is not Larger than Available Space of a WRAM

The large map mode has fewer restrictions on the WRAM 432. The reason is that an on-chip unit map that is loaded into the SRAM 308 is only part of a feature map, and when the template fuse unit is computed, the WRAM 432 is only required to store all weights of this feature map. However, since a plurality of feature maps may be loaded into the SRAM 308 in the small map mode, required weights will be increased in this situation, and whether the available space of the WRAM 432 is sufficient should be evaluated carefully. This rule is that storage space required by the weight in the on-chip unit map is not larger than the available space of the WRAM 432. When the processing apparatus 203 judges that this rule is not satisfied, the processing apparatus 203 reduces a size of the on-chip unit map.

If the weight is split based on an output channel parameter Cout of the C dimension, since the weight will be averagely distributed among a plurality of processor cores 306, this rule is adjusted as:

$$\frac{W_j}{n} \le W$$

$W_j$ refers to storage space required by a weight involved in an on-chip unit map j, n refers to the number of processor cores in a cluster, and W refers to the available space of the WRAM 432.

Rule 11: Redundancy Percentage

The redundancy percentage refers to a ratio of a sum of redundancy generated by the input-dependent operation and the output-dependent operation to the amount of normal input/output of the template fuse unit. Here, the amount of normal input/output refers to the amount of data of the on-chip unit map before splitting without redundancy. The processing apparatus 203 computes a percentage of the amount of memory access $size_{TFU}$ of the on-chip unit map from the DRAM 204 to the SRAM 308 to the amount of normal input/output (excluding redundancy) $size_{ori}$ after the template fuse unit fuses a current layer. Here, the amount of memory access $size_{TFU}$ refers to the theoretical amount of memory access $size_{ori}$ plus the sum of redundancy. The formula is as follows:

$$\frac{(size_{TFU} - size_{ori})}{size_{ori}} \times 100\% \ge \text{precentage threshold.}$$

The processing apparatus 203 takes into account split information and shape derivation of the template fuse unit and sets the percentage threshold to 50%, 75%, 100%, 125%, or 150%. Preferably, the processing apparatus 203 sets the percentage threshold to 100%. For example, when the percentage threshold is 100%, it is represented that, when the sum of redundancy is more than twice of the amount of normal input/output of the template fuse unit, the fusion is not performed. This rule is that a sum of redundancy generated by splitting the on-chip unit map does not exceed a specific proportion associated with the percentage threshold. Once the sum of redundancy generated by splitting the on-chip unit map exceeds the specific proportion associated with the percentage threshold, it is represented that there are too many redundant parts, and a lot of resources are spent on computing redundancy, thus reducing efficiency. Therefore, when the processing apparatus 203 judges that this rule is not satisfied, the processing apparatus 203 stops the fusion.

It is required to note that, in the small map mode, since at least one complete feature map is loaded from the DRAM 204 to the SRAM 308 at a time, there is no redundancy. This rule is not applicable to the small map mode.

Rule 12: Input and Output Sizes of an On-Chip Unit Map

Assuming that a size of space of the SRAM 308 is S, storage space required by the on-chip unit map is IN, and storage space required by computing results of the on-chip unit map is OUT, then, this rule is that the size of the space of the SRAM 308 is required to satisfy following conditions.

If IN and OUT may not reuse the storage space, IN+OUT<S.

If IN and OUT may reuse the storage space, MAX(IN, OUT)<S.

In other words, if IN and OUT may not reuse the storage space, a sum of the storage space of the on-chip unit map and the storage space of the computing results is smaller than the available space of the SRAM 308; and if IN and OUT may reuse the storage space, the larger of the storage space of the on-chip unit map and the storage space of the computing results is smaller than the available space of the SRAM 308.

Rule 13: $W_i$+IN1+IN2≤S

In the small map mode, this rule is that the size of the space of the SRAM 308 is required to satisfy a following condition:

$$W_i + \text{IN1} + \text{IN2} \le S$$

In other words, a sum of storage space$W_i$ required by a weight of a sub-map i, storage spaceIN1required by the on-chip unit map, and caching spaceIN2 is not larger than the available space of the SRAM 308. When the processing apparatus 203 judges that this rule is not satisfied, the processing apparatus 203 decreases the number of on-chip unit maps until this rule is satisfied.

Rule 14: SubINi+$W_i$+IN2≤S

In the small map mode, this rule is that the size of the space of the SRAM 308 is required to satisfy a following condition:

$$\text{Sub IN } i + W_i + \text{IN2} \le S$$

In other words, a sum of storage space SubINi required by the sub-map i, the storage space$W_i$required by the weight of the sub-map i, and the cache spaceIN2 is not larger than the available space of the SRAM 308. When the processing apparatus 203 judges that this rule is not satisfied, the processing apparatus 203 decreases the number of on-chip unit maps until this rule is satisfied.

Rule 15: SubOUTi+$W_{i+1}$+IN2≤S

In the small map mode, this rule is that the size of the space of the SRAM 308 is required to satisfy a following condition:

$$\text{Sub OUT } i + W_{i+1} + \text{IN2} \le S$$

In other words, a sum of storage space SubOUTi required by intermediate results of the sub-map i, storage space$W_{i+1}$ required by a weight of a next sub-map, and the cache spaceIN2 is not larger than the available space of the SRAM 308. When the processing apparatus 203 judges that this rule is not satisfied, the processing apparatus 203 decreases the number of on-chip unit maps until this rule is satisfied.

Rule 16: $W_i$+$W_{i+1}$≤W

A weight involved in a convolution operation in the template fuse unit is moved independently and resides on the WRAM 432. In the small map mode, if the sub-map includes the plurality of feature maps, considering pipelining between the sub-maps, the WRAM 432 stores weights of two adjacent sub-maps at most simultaneously. Assuming that storage space required by each sub-map i is $W_i$, and total space of the WRAM 432 is W, this rule is that the size of the space of the WRAM 432 is required to satisfy a following condition:

$$W_i + W_{i+1} \le W$$

In other words, a sum of the storage space$W_i$required by the weight of the sub-map i and the storage space$W_{i+1}$required by the weight of the next sub-map is not larger than the available space of the WRAM 432. When the processing apparatus 203 judges that this rule is not satisfied, the processing apparatus 203 decreases the number of on-chip unit maps until this rule is satisfied.

Rule 17: Storage Space Required by a Sub-Map is not Larger than Available Space of an NRAM This rule is that the storage space required by the sub-map is not larger than the available space of the NRAM 431. When the on-chip unit map in the SRAM 308 is to be split into the sub-maps and moved to the NRAM 431, the processing apparatus 203 may perform fine-grained splitting in the N, H, and W dimensions. If the space of the NRAM 431 is not enough, the processing apparatus 203 splits the on-chip unit map into finer pieces until this rule is satisfied. In general, the NRAM 431 has reasonable available space, so that the on-chip unit map may be loaded at a time once the on-chip unit map is split to a reasonable degree. From the perspective of the fusion policy, the template fuse unit is not affected by the number of batches. However, the on-chip unit map is split more finely (there are more sub-maps), and the processing speed will be decreased. Therefore, the processing apparatus 203 is required to evaluate the space of the NRAM 431.

In some embodiments, the space of the SRAM 308 corresponds to the number of NRAMs 431 of the processing cores 306 in the cluster 305. For example, the cluster 305 includes four processor cores 306, and then the space of the SRAM 308 is four times of the space of the NRAM 431. In other words, in the large map mode, the on-chip unit map may generally be allocated to four processor cores 306 for processing. This kind of architecture design has considered that data that is loaded into the SRAM 308 may be allocated to all the NRAMs 431 at a time. Therefore, this rule is not required to be considered in the large map mode.

Rule 18: The Number of Feature Maps is not Greater than a Feature Map Threshold

In the small map mode, the on-chip unit map may include a plurality of feature maps. The more the feature maps, the more the number of times of transferring the sub-maps between the SRAM 308 and the NRAM 431, and the efficiency will be decreased. Therefore, it is not always better to include more feature maps in the on-chip unit map. The processing apparatus 203 computes an appropriate number of fusion layers based on the number of feature maps in the on-chip unit map to maximize benefits. This rule is that the number of feature maps in the on-chip unit map is not greater than the feature map threshold. When the processing apparatus 203 judges that this rule is not satisfied, the processing apparatus 203 decreases the number of feature maps in on-chip data until this rule is satisfied.

Rule 19: Stride Redundancy

The stride redundancy means that, when the template fuse unit fuses too many layers, and the lengths of and widths of kernels of the convolution layer and the pooling layer are larger than a stride, there is an overlap between input data required by each output point, which is the aforementioned input-dependent operation. This overlap is the stride redundancy. The stride redundancy makes each processor core 306 be required to read more data. However, this part of reused data may occupy on-chip and off-chip access resources. The more layers the template fuse unit includes, the more serious the stride redundancy is. This rule is that a sum of difference values between side lengths of the kernel of the convolution layer or the pooling layer and the stride is not greater than a redundancy threshold.

In this embodiment, the definition of the redundancy threshold is as follows. Assuming that the length and width of the kernel of the convolution layer and the pooling layer are $k_x$ and $k_y$, and strides in the length and width directions are $s_x$ and $s_y$ respectively, and then stride redundancy in the length direction is a sum of $k_x-s_x$ of all convolution layers and all pooling layers in the template fuse unit. Similarly, stride redundancy in the width direction is a sum of $k_y-s_y$ of all the convolution layers and all the pooling layers in the template fuse unit. The redundancy threshold of this embodiment may be 3, 4, 5, or 6, and preferably, the redundancy threshold may be 4. This rule is not satisfied as long as the stride redundancy in either of the length or width directions is greater than the redundancy threshold. The processing apparatus 203 adjusts the template fuse unit. Usually, the processing apparatus 203 decreases the number of layers that are fused until this rule is satisfied.

The fusion policy provides an exception rule for the stride redundancy. If there are multiple branches in the layer to be fused and the template fuse unit may fuse the whole multiple branches, the performance of the template fuse unit may be better. In this situation, the processing apparatus 203 ignores the rule for the stride redundancy, which means that the stride redundancy does not restrict the template fuse unit to fuse the multiple branches. In other words, in the fusion policy of this embodiment, fusing the multiple branches takes precedence over the restriction of the stride redundancy. In other words, the stride redundancy is only considered in the case of a single branch.

The above rules are only examples. The present disclosure does not restrict the order in which each rule is performed or the fact that these rules are required to be considered simultaneously. Those skilled in the art may add or delete the rules based on actual situations in different application scenarios, so as to implement a fusion policy that meets a current application scenario.

Going back to FIG. 12A, in a step 1203, neural network computing is performed according to the template fuse unit created. The computing apparatus 201, based on a three-level operation hierarchy of SoC-cluster-processor core, in combination with three-level memory design of DRAM-SRAM-NRAM/WRAM, takes the template fuse unit as a self-defined layer in the neural network and loads data required for computing the template fuse unit from the DRAM 204 to the SRAM 308 at a time. As such, the data may be cached and computed at appropriate levels, thereby forming sufficient pipelining. After computing, the computing apparatus 201 sends computing results from the SRAM 308 to the DRAM 204, which greatly reduces input/output overheads in the neural network computing.

When input data from fields such as computer vision, speech, natural language processing, and data mining is intended for performing various deep learning algorithms and various machine learning algorithms, the present disclosure, based on the template fuse unit, may reduce the input/output overheads in the neural network computing.

Figure 12B:
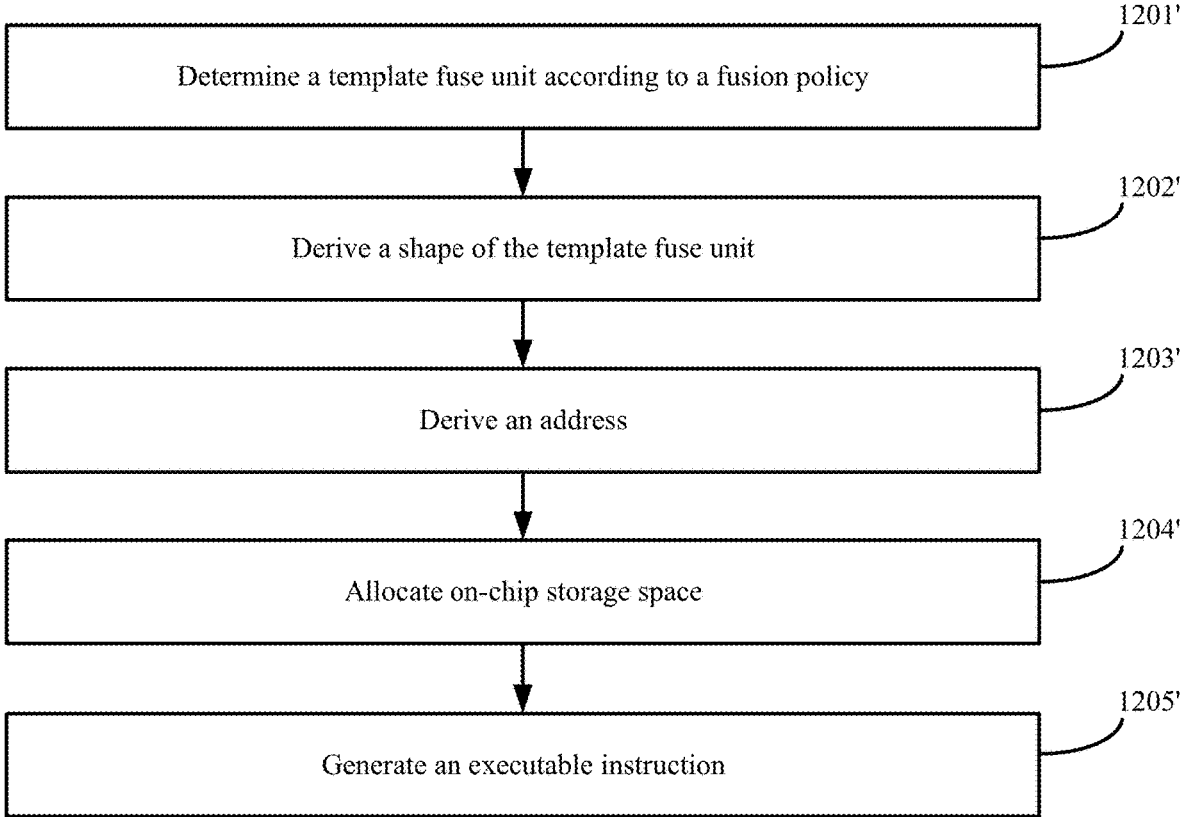
FIG. 12B is a first flowchart of performing neural network computing by using a template fuse unit according to an embodiment of the present disclosure.

Another embodiment of the present disclosure shows a first method for performing neural network computing by using a template fuse unit. FIG. 12B shows a process of this method.

In a step 1201', the template fuse unit is determined according to a fusion policy. The processing apparatus 203 selects a starting layer of the template fuse unit according to a starting rule of the fusion policy. Moreover, the processing apparatus 203 performs a fusion based on the starting layer and checks all rules of the fusion policy one by one to create the template fuse unit. The previous embodiment has illustrated various rules of the fusion policy with examples in detail, which will not be repeated herein.

In this step, the template fuse unit is represented in the form of a source code. Next, it is required to convert the source code into an object code of machine language, which is also known as machine code, through a compiler. The following steps show a process of converting the source code of the template fuse unit into the object code of the machine language by the compiler.

In a step 1202', a shape of the template fuse unit is derived. For data that is required to be processed by the template fuse unit, this embodiment adopts a method of reverse derivation. The compiler reversely derives forward what size of inputs is required from outputs. Taking FIG. 8B as an example, the compiler performs reverse derivation from a feature map 803 to a feature map 802, and then to a feature map 801. In this step, the compiler not only derives required input data according to the template fuse unit, but also further derives redundancy.

Next, a step 1203' is performed to derive an address. According to the shape of the template fuse unit, the compiler derives an address of on-chip storage space of the whole control flow graph and implements access to a general address, so as to achieve the purpose of simplifying computing resources and shortening computing time. The control flow graph is an abstract data structure used in the compiler. The control flow graph represents all paths that a program may perform and reflects possible flow directions of all nodes in the process in the form of a flowchart. The control flow graph is composed of relationships between nodes. A node is also called a basic block (BB) and is a statement sequence that is performed sequentially to the maximum in the program. Each basic block has only one entrance and one exit. Data enters through the entrance and exits through the exit during execution. The characteristic of the basic block is that all instructions in the basic block are performed in order as long as a first instruction in the basic block is performed.

Each basic block includes at least one instruction. The instruction in the basic block may point to specific on-chip storage space by using a pointer. The pointer is a kind of variable and is used for saving an address of specific address space. Through the pointer, the processor cores 306 may load data into the space of the specific address pointed to by the pointer or fetch the data from the specific address pointed to by the pointer.

According to the division of the template fuse unit, the compiler initially divides basic blocks and then confirms the basic blocks and mutual relations between the basic blocks after iterative operations. At this point, the object code for implementing the template fuse unit is completed.

Not only that, the compiler also analyzes reused data of two front and back template fuse units in the neural network, judges how much data in a previous template fuse unit may be left on the chip for use by a next template fuse unit, and plans a storage address of each piece of data according to a judging result.

In this step, the compiler completes the derivation of the address in the control flow graph.

In a step 1204', on-chip storage space is allocated. The processing apparatus 203 allocates physical space for the SRAM 308, the NRAM 431, and the WRAM 432 based on the derivation of the address of the template fuse unit. In this step, the compiler completes the pointing of the pointer in the control flow graph.

Finally, a step 1205' is performed to generate an executable instruction. In this step, a linker links the object code generated by the compiler with a library, so as to make the object code into an executable file. More specifically, the object code is a program unit that includes a machine code and linker available information. The linker is used to parse undefined symbolic references, replace a placeholder in the object code with an address of a symbol, and then generate the executable instruction. The executable instruction may be performed directly by the computing apparatus 201 to complete the computing of the neural network.

Figure 12C:
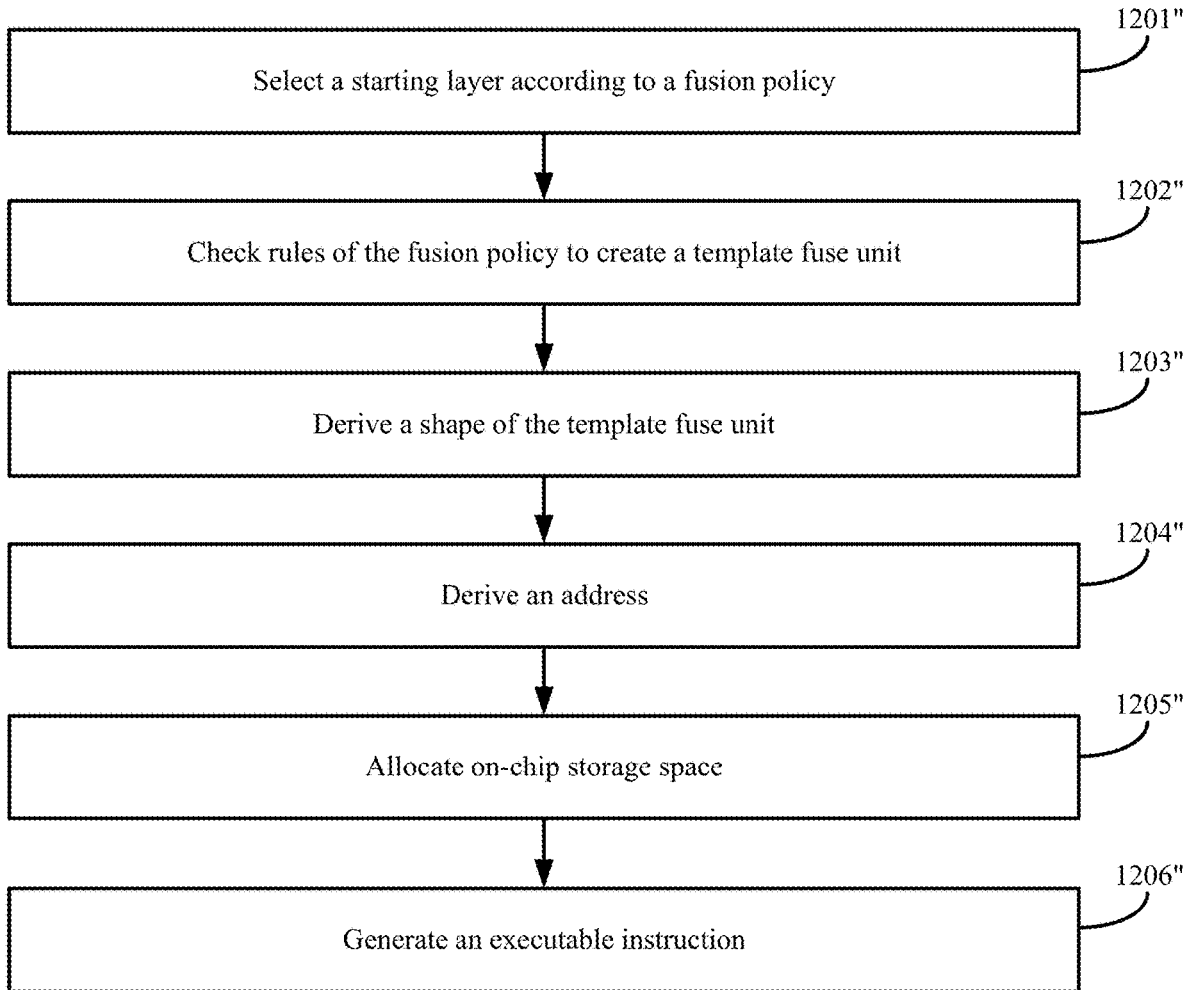
FIG. 12C is a second flowchart of performing neural network computing by using a template fuse unit according to an embodiment of the present disclosure.

Another embodiment of the present disclosure shows a second method for performing neural network computing by using a template fuse unit. FIG. 12C shows a process of this method.

In a step 1201", a starting layer of the template fuse unit is selected according to a starting rule of a fusion policy. The processing apparatus 203 selects the starting layer of the template fuse unit according to the starting rule of the fusion policy. In other words, the processing apparatus 203 selects a layer that starts to fuse among unfused layers in a neural network model.

In a step 1202", a fusion is performed based on the starting layer, and all rules of the fusion policy are checked one by one to create the template fuse unit. The processing apparatus 203 performs the fusion based on the starting layer and checks all the rules of the fusion policy one by one to create the template fuse unit. Various rules of the fusion policy have been illustrated with examples in detail in the description of FIG. 12B, which will not be repeated herein. On the premise that all the rules are satisfied, hardware resources of the computing apparatus 201 are sufficient to load data required for computing the template fuse unit at a time and then perform the neural network computing according to the template fuse unit.

Since layer 4 is exemplarily set as a starting layer of this template fuse unit in the step 1201", in this step, the fusion is performed backward from layer 4, and all the rules of the fusion policy are checked one by one to create the template fuse unit First, layer 5 in regular pyramid layers is fused. If the fusion may continue, the processing apparatus 203 continues to fuse backward.

Figure 13A:
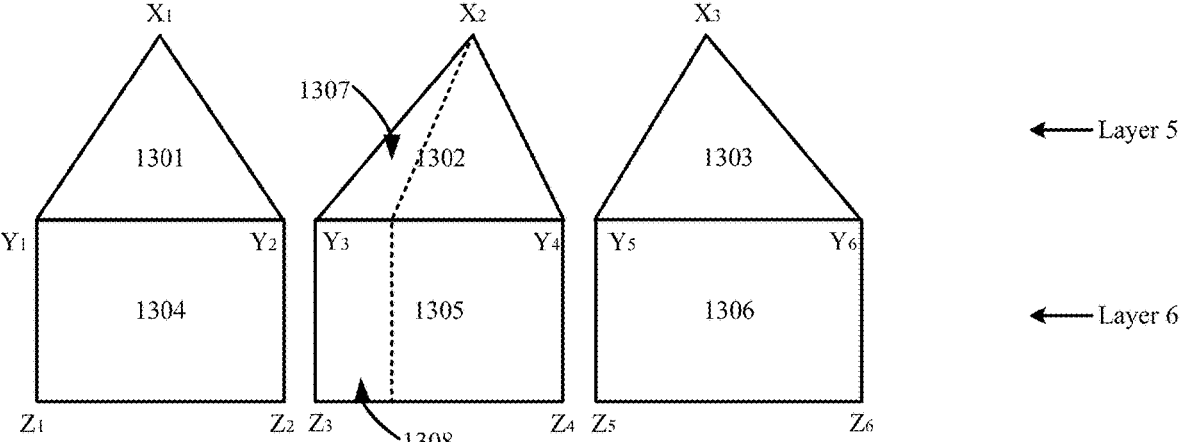
FIG. 13A is a schematic diagram of shapes of input and output maps of an exemplary neural network model.
Figure 13B:
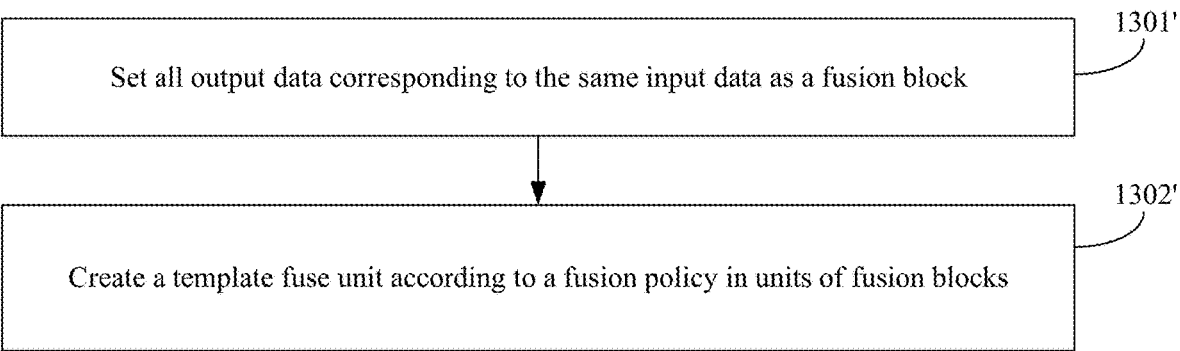
FIG. 13B is a flowchart of creating a template fuse unit based on a regular pyramid layer according to an embodiment of the present disclosure.

A fusion method of regular pyramid layers will be explained below. FIG. 13A show shapes of input/output feature maps of layer 5 and layer 6 in FIG. 11. Taking a fusion of layers 5 and layer 6 in FIG. 13A as an example, it is assumed that layer 5 is a deconvolution layer, and layer 6 is a Relu activation layer. For the convenience of illustration, an input feature map of layer 5 exemplarily includes three pieces of input data, which are $X_1$, $X_2$, and $X_3$. The input data $X_1$ generates output data $Y_1$ to $Y_2$ after passing through layer 5. The input data $X_2$ generates output data $Y_3$ to $Y_4$ after passing through layer 5. The input data $X_3$ generates output data $Y_5$ to $Y_6$ after passing through layer 5. The output data $Y_1$ to $Y_6$ are activated by layer 6. Since an activation layer does not change the amount of data, input data $Y_1$ to $Y_6$ respectively generates output data $Z_1$ to $Z_6$ shown in the figure after passing through layer 6. FIG. 13B is a flowchart of creating a template fuse unit based on regular pyramid layers.

When the template fuse unit is created according to a fusion policy in this step, this embodiment treats all output data of the same input data as one fusion block. FIG. 13A shows that layer 5 includes three fusion blocks, where $X_1$-$Y_1$-$Y_2$ is a first fusion block 1301, $X_2$-$Y_3$-$Y_4$ is a second fusion block 1302, and $X_3$-$Y_5$-$Y_6$ is a third fusion block 1303. Layer 6 also includes three fusion blocks, where $Y_1$-$Y_2$-$Z_1$-$Z_2$ is a fourth fusion block 1304 (from the input data $X_1$), $Y_3$-$Y_4$-$Z_3$-$Z_4$ is a fifth fusion block 1305 (from the input data $X_2$), $Y_5$-$Y_6$-$Z_5$-$Z_6$ is a sixth fusion block 1306 (from the input data $X_3$).

In a step 1301', the processing apparatus 203 sets all output data corresponding to the same input data as a fusion block; in other words, the processing apparatus 203 identifies fusion blocks 1301-1306 mentioned above.

In a step 1302', the template fuse unit is created according to a fusion policy in units of fusion blocks. In addition to rules 1 to 18 mentioned above, rules related to fusing the regular pyramid layers further include the following.

Rule 19: In Units of Fusion Blocks

Based on hardware resources of each processor core 306, a fusion block is allocated to each processor core 306 in units of fusion blocks. Since the fusion block has the same input data and is a complete data block, it is more convenient to cut an on-chip unit map into sub-maps in units of fusion blocks. If a sub-map includes incomplete fusion blocks, for example, including a fusion block 1301, a fusion block 1304, part of fusion block 1302 (data block 1307), and part of fusion block 1305 (data block 1308), this makes it difficult for a next processor core 306 to judge processed and unprocessed parts of the fusion block 1302 and the fusion block 1305. More specifically, limited by hardware communication, the next processor core 306 is unable to know sizes of the data block 1307 and the data block 1308. As a result, there is a problem when the on-chip unit map is cut into the sub-maps, and part of the data is missed and not computed.

To avoid the foregoing situation, the processing apparatus 203 allocates the fusion block to each processor core 306 in units of fusion blocks. Assuming that a certain processor core 306 still has space after completely computing the fusion block 1301 and the fusion block 1304, the processing apparatus 203 further judges whether this processor core 306 may also compute the fusion block 1302 and the fusion block 1305. If this processor core 306 may also compute the fusion block 1302 and the fusion block 1305, the processing apparatus 203 allocates the fusion block 1302 and the fusion block 1305 to this processor core 306. If this processor core 306 may not compute the fusion block 1302 and the fusion block 1305, the processing apparatus 203 allocates the fusion block 1302 and the fusion block 1305 to the next processor core 306.

Rule 20: Repeatedly Computing a Fusion Block

When a specific fusion block is computed repeatedly among processor cores, a specific processor core 306 is assigned to compute the specific fusion block, and an intermediate result of computing the specific fusion block is stored to the SRAM 308. The memory core 307 merges the intermediate result into intermediate results generated by other processor cores 306.

For example, assuming that according to other fusion policies, fusion blocks 1301, 1302, 1304 and 1305 are allocated to a first processor core, and fusion blocks 1302, 1303, 1305 and 1306 are allocated to a second processor core, fusion blocks 1302 and 1305 are computed repeatedly. In order to save computing resources, the processing apparatus 203 will readjust the amount of tasks. The fusion blocks 1302 and 1305 are assigned to only one processor core, such as the first processor core, so the first processor core still computes the fusion blocks 1301, 1302, 1304, 1305, but the second processor core only computes fusion blocks 1303 and 1306. Therefore, after the computing of the first processor core, intermediate results are stored to the SRAM 308. The memory core 307 merges intermediate results obtained after computing the fusion block 1302 and 1305 by the first processor core with intermediate results of computing the fusion block 1303 and 1306 by the second processor core, so as to generate intermediate results corresponding to the fusion blocks 1301, 1302, 1304 and 1305 and intermediate results corresponding to the fusion blocks 1302, 1303, 1305 and 1306. On the one hand, computing resources are saved, and on the other hand, output-dependent relationships are satisfied.

Other rules mentioned above also should be satisfied. For example, according to the rule 14, in the small map mode, the sum of the storage space SubOUTi required by the intermediate result of the sub-map i, the storage space $W_{i+1}$ required by the weight of the next sub-map, and the cache space IN2 is not greater than the available space of the SRAM 308. When the processing apparatus 203 judges that this rule is not satisfied, the processing apparatus 203 decreases the number of on-chip unit maps until this rule is satisfied. For another example, according to the rule 9, storage space required by a weight involved in the fusion block is not larger than the available space of the WRAM 432. When the processing apparatus 203 judges that these fusion policies are not satisfied, the processing apparatus 203 decreases the number of fusion blocks. Other rules will not be repeated herein.

Since regular pyramid layers may be required to enlarge a size of an output image by supplementing 0 in a certain proportion, rotate a convolution kernel, and then perform forward convolution, when the fusion of the regular pyramid layers is involved, the weight refers to an output channel weight after 0 is supplemented.

This embodiment does not limit the fusion methods of the regular pyramid layers and inverted pyramid layers. The fusion method may only fuse all the regular pyramid layers together. For example, the template fuse unit includes layers 5 to 9. Moreover, the fusion method may mix the regular pyramid layers and the inverted pyramid layers together. For example, the template fuse unit includes layers 3 to 6, or the template fuse unit includes layers 9 to 12. In other words, the template fuse unit may include only the regular pyramid layers. Moreover, the template fuse unit may include the inverted pyramid layers plus the regular pyramid layers or the regular pyramid layers plus the inverted pyramid layers.

Going back to FIG. 12C, in a step 1202", the template fuse unit is represented in the form of a source code. Next, it is required to convert the source code into an object code of machine language, which is also known as a machine code, through a compiler. The following steps show a process of converting the source code of the template fuse unit into the object code of the machine language by the compiler.

Next, a step 1203" is performed to derive a shape of the template fuse unit. For data that is required to be processed by the template fuse unit, this embodiment adopts a method of reverse derivation. The compiler reversely derives forward what size of inputs is required from outputs. Taking FIG. 8B as an example, the compiler performs reverse derivation from a feature map 803 to a feature map 802, and then to a feature map 801. In this step, the compiler not only derives required input data according to the template fuse unit, but also further derives redundancy.

Next, a step 1204" is performed to derive an address. According to the shape of the template fuse unit, the compiler derives an address of on-chip storage space of the whole control flow graph and implements access to a general address, so as to achieve the purpose of simplifying computing resources and shortening computing time. The control flow graph is an abstract data structure used in the compiler. The control flow graph represents all paths that a program may perform and reflects possible flow directions of all nodes in the process in the form of a flowchart. The control flow graph is composed of relationships between nodes. A node is also called a basic block (BB) and is a statement sequence that is performed sequentially to the maximum in the program. Each basic block has only one entrance and one exit. Data enters through the entrance and exits through the exit during execution. The characteristic of the basic block is that all instructions in the basic block are performed in order as long as a first instruction in the basic block is performed.

Each basic block includes at least one instruction. The instruction in the basic block may point to specific on-chip storage space by using a pointer. The pointer is a kind of variable and is used for saving an address of specific address space. Through the pointer, the processor cores 306 may load data into the space of the specific address pointed to by the pointer or fetch the data from the specific address pointed to by the pointer.

According to the division of the template fuse unit, the compiler initially divides basic blocks and then confirms the basic blocks and mutual relations between the basic blocks after iterative operations. At this point, the object code for implementing the template fuse unit is completed.

Not only that, the compiler also analyzes reused data of two front and back template fuse units in the neural network, judges how much data in a previous template fuse unit may be left on the chip for use by a next template fuse unit, and plans a storage address of each piece of data according to a judging result.

In this step, the compiler completes the derivation of the address in the control flow graph.

In a step 1205", on-chip storage space is allocated. The processing apparatus 203 allocates physical space for the SRAM 308, the NRAM 431, and the WRAM 432 based on the derivation of the address of the template fuse unit. In this step, the compiler completes the pointing of the pointer in the control flow graph.

Finally, a step 1206" is performed to generate an executable instruction. In this step, a linker links the object code generated by the compiler with a library, so as to make the object code into an executable file. More specifically, the object code is a program unit that includes a machine code and linker available information. The linker is used to parse undefined symbolic references, replace a placeholder in the object code with an address of a symbol, and then generate the executable instruction. The computing apparatus 201 performs the executable instruction to perform the neural network computing according to the template fuse unit.

This embodiment may fuse the regular pyramid layers and the inverted pyramid layers. Such a fusion policy may make the template fuse unit more flexible and free from the limitation on the sizes of the input feature maps and the output feature maps, thereby adapting to various network models, making the fusion more comprehensive, and improving the overall benefit.

Additionally, when the rules of the fusion policy mentioned above are used to determine the template fuse unit, it is not necessary to start the fusion with the convolution layer or the pooling layer. As mentioned in the above embodiment, in an application scenario, the starting rule may be that the starting layer is the top unfused layer in the neural network, and this layer may be a layer other than the convolution layer or the pooling layer. Such a starting rule makes the creation of the template fuse unit more flexible. For different neural networks, based on the ordering of each layer, the starting layer is appropriately selected to start the fusion, which is not limited by the positions and number of convolution layers or pooling layers in the neural network model, thereby adapting to various network models, making the fusion more comprehensive, and improving the overall benefit.

For example, taking the neural network model in FIG. 6A as an example, assuming that layers 1 to 5 are fused, when a next template fuse unit is created, if the starting rule is that the starting layer is the top unfused convolution or pooling layer, a next convolution or pooling layer is layer 8. In other words, layer 6 and layer 7 may not be fused, and the overall benefit may be affected.

Another embodiment of the present disclosure is a solution of fusing the neural network, where the starting layer is the layer other than the convolution layer and the pooling layer; in other words, the starting layer is a non-convolution layer and a non-pooling layer. This embodiment is also implemented based on the framework shown in FIGS. 1-4. This embodiment also performs the flowchart shown in FIG. 12A.

In a step 1201, the starting layer is selected according to the fusion policy. The processing apparatus 203 selects the starting layer according to the fusion policy. For example, the starting rule of the fusion policy is that the starting layer is the top unfused layer in the neural network, and this layer is the layer other than the convolution layer or the pooling layer. The starting layer may be an element-wise layer, an add padding layer, or a self-defined layer.

It is required to note that this step does not adopt the starting rule in which the starting layer is the top unfused convolution or pooling layer. If the starting layer is selected according to this starting rule, the starting layer may be restricted as either the convolution layer or the pooling layer. As such, the advantage that this embodiment is not limited by the positions and number of the convolution layers or the pooling layers in the neural network model does not exist.

If the neural network includes the branch structure, according to the rule 3, the fusion is performed preferentially in units of branch structures. However, sometimes, the branch structure is too complex to integrate the whole branch structure into the template fuse unit, and the fusion of the branch structure has to be abandoned based on the rule. Not only that, the rule 4 requires the output of the template fuse unit to be the single-branch output, which also reflects that the fusion must be performed in units of branch structures. In other words, fusion policies of the rule 3 and the rule 4 are not friendly to a neural network model with the branch structure, and fusion effect is not good.

Figure 13C:
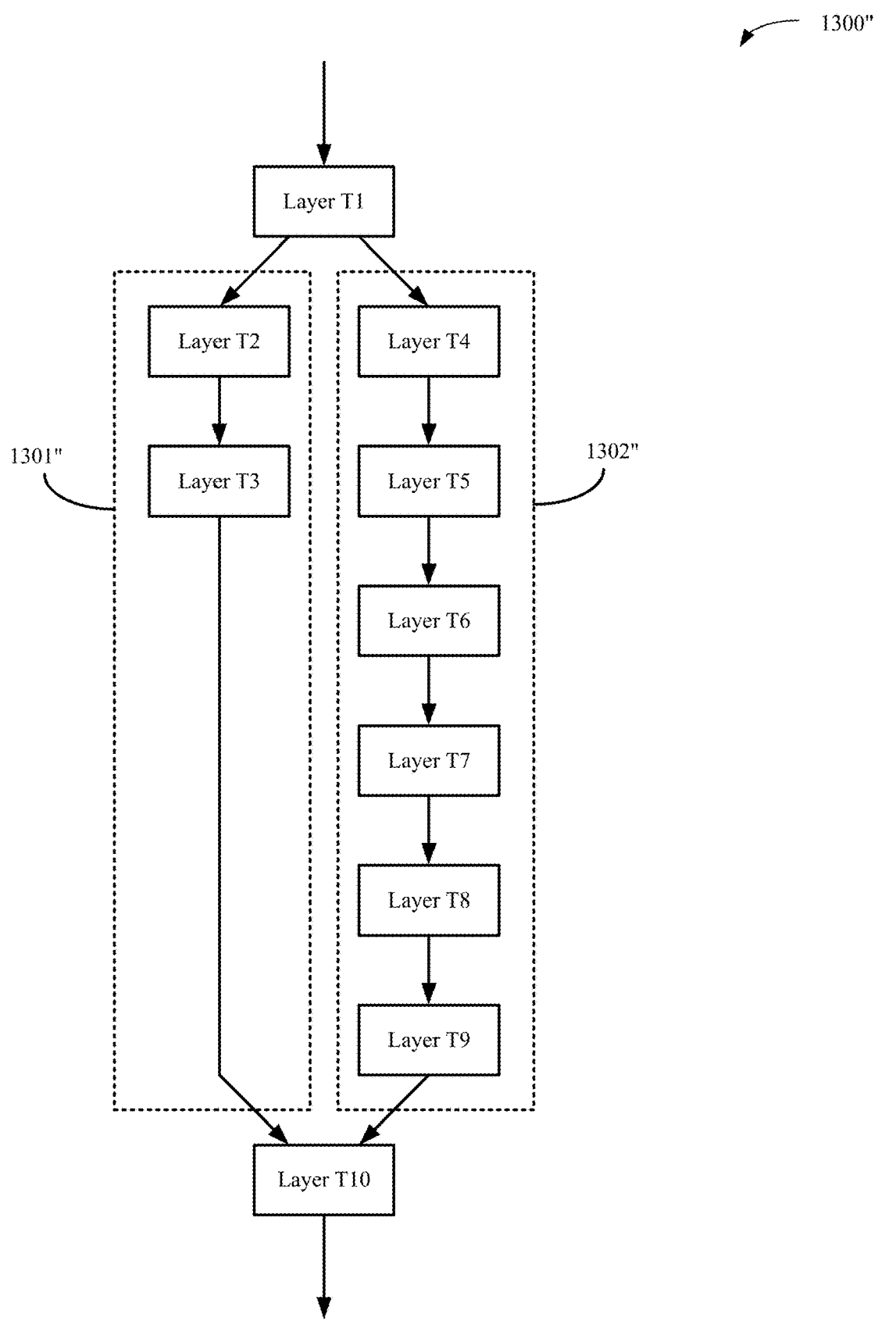
FIG. 13C is an exemplary neural network model fragment.

Another embodiment of the present disclosure is an apparatus for dynamically fusing a branch structure of a neural network according to a fusion policy. The apparatus also has the structure shown in FIGS. 1 to 4. This embodiment does not necessarily have to perform the fusion by a complete branch structure. FIG. 13C shows an exemplary neural network model fragment. The fragment includes a branch structure 1300". A starting point of the branch structure 1300" is layer T1, and an ending point of the branch structure 1300" is layer T10. From layer T1, there are a first branch 1301" and a second branch 1302". The first branch 1301" includes layer T2 and layer T3, and the second branch 1302" includes layers T4 to T9.

When the branch structure 1300" is fused, the processing apparatus 203 first creates a topological sequence for the branch structure 1300". The topological sequence refers to a linear sequence of all nodes in a directed acyclic graph. The topological sequence must satisfy the following two conditions: each node must occur and must occur only once; and if there is a path from a node A to a node B, then, the node A appears before the node B in the sequence. In brief, the topological sequence is a process of obtaining a complete sequence of a certain set from a partial sequence of the set. Based on the above principle, when creating the topological sequence, the processing apparatus 203 first identifies the starting point and the ending point of the branch structure 1300", where the starting point is layer T1 and the ending point is layer T10. The processing apparatus 203 sets the starting point of the branch structure 1300" as a starting point of the topological sequence, and the starting point of the branch structure 1300" is also set as the starting layer of the template fuse unit. Moreover, the processing apparatus 203 sets the ending point of the branch structure 1300" as an ending point of the topological sequence. Then, the processing apparatus 203 arranges each layer in the middle of the branch structure 1300" according to the topological sequence. There are two ways of arrangement.

Figure 14:
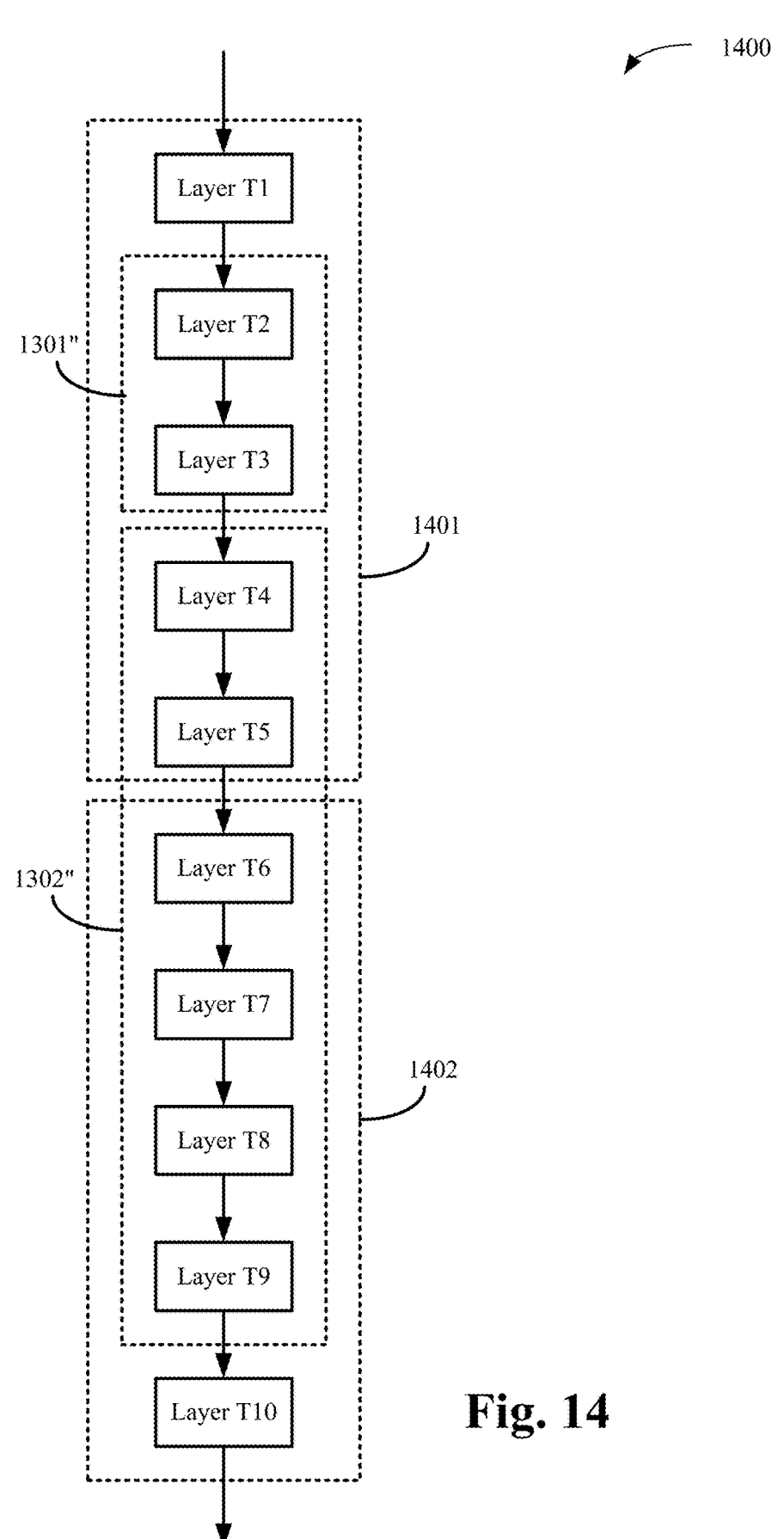
FIG. 14 is a schematic diagram of a topological sequence of a branch structure according to an embodiment of the present disclosure.

The first arrangement is to compare the number of layers of each branch and then arrange each layer of a sub-branch in a descending order of the number of layers. The second arrangement is to compare the number of layers on each branch and then arrange each layer of the sub-branch in an ascending order of the number of layers. This embodiment adopts the second arrangement. The first branch 1301" has two layers, and the second branch 1302" has six layers. The number of layers of the first branch 1301" is less, so each layer in the first branch 1301" is arranged before each layer in the second branch 1302". Based on this arrangement, as shown in FIG. 14, a topological sequence of layer T1→layer T2→layer T3→layer T4→layer T5→layer T6→layer T7→layer T8→layer T9→layer T10 is formed. After conversion, the topological sequence of the branch structure 1300" forms a long-chain structure 1400.

This embodiment is in units of layers in the topological sequence rather than in units of the entire branch structure to add or delete the template fuse unit. The processing apparatus 203 replaces the branch structure 1300" with the long-chain structure 1400 and checks rules of the fusion policy to create the template fuse unit. In other words, the processing apparatus 203 regards a neural network model with the branch structure 1300" as a neural network model with the long-chain structure 1400 and performs a fusion based on a starting layer (layer T1) of the long-chain structure 1400. In this way, any rule (except the rule 3 and the rule 4) in the above fusion policy may be selected to create the template fuse unit.

Figure 15:
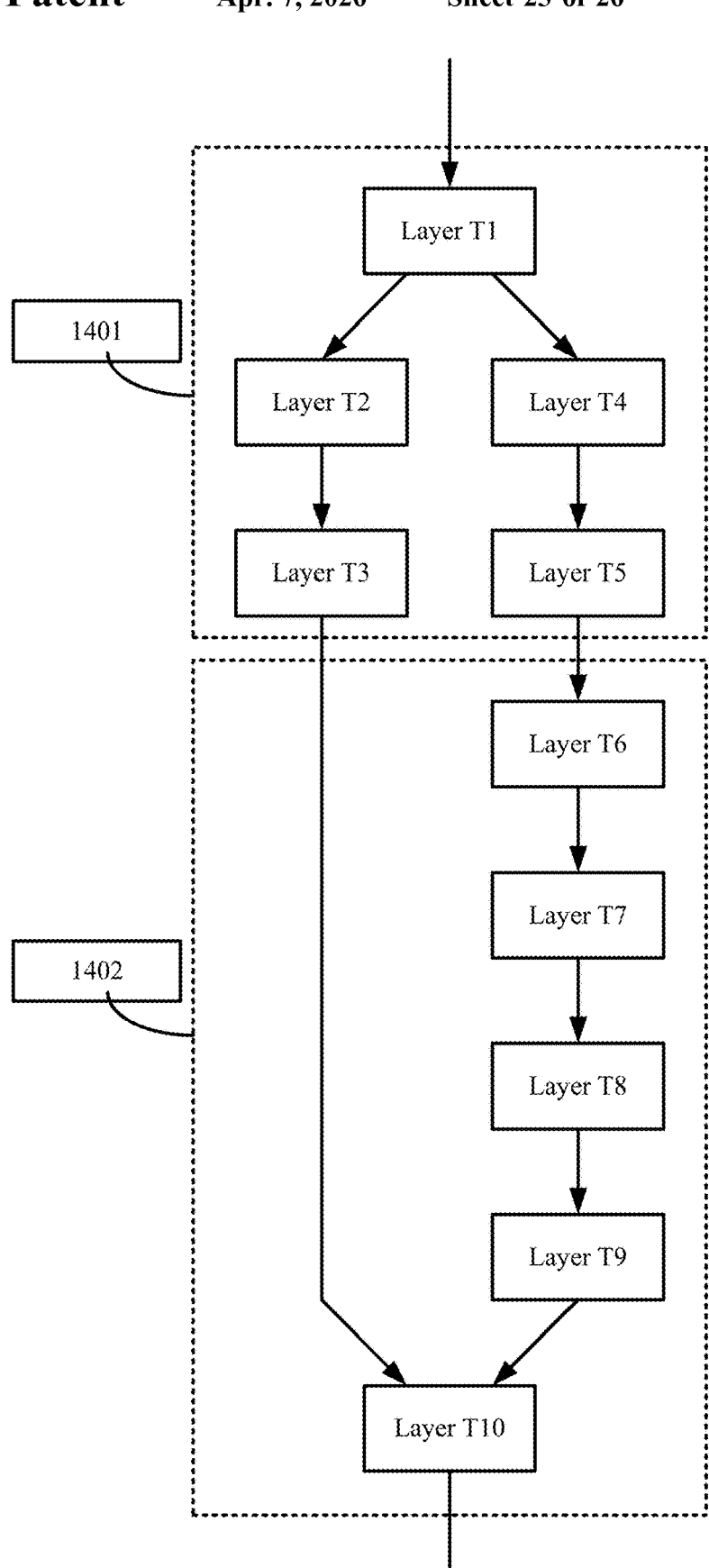
FIG. 15 shows a schematic diagram of restoring a long-chain structure to a branch structure according to an embodiment of the present disclosure.

In this embodiment, it is not necessary for the template fuse unit to include the entire branch structure. For example, it is assumed that the long-chain structure 1400 may generate two template fuse units: a first template fuse unit 1401 including layers T1 to T5 and a second template fuse unit 1402 including layers T6 to T10. When the long-chain structure 1400 is restored to the branch structure, shapes of the first template fuse unit 1401 and the second template fuse unit 1402 are shown in FIG. 15. The first template fuse unit 1401 has two branch outputs, which are respectively connected to layer T10 and layer T6 of the second template fuse unit 1402. In other words, the first template fuse unit 1401 has two output ends, and the second template fuse unit 1402 has two input ends.

In order to make data moving more efficient, when deriving the shape of the first template fuse unit 1401, the processing apparatus 203 then judges whether the first template fuse unit 1401 includes the ending point of the branch structure. The first template fuse unit 1401 does not include layer T10. The processing apparatus 203 further judges whether the available space of the NRAM 431 is large enough. If the available space of the NRAM 431 is large enough, when the processing apparatus 203 derives the address, the computing apparatus 201 stores two computing results (intermediate results of layer T3 and layer T5 of the last layer) generated by the first template fuse unit 1401 to the NRAM 431. The reason is that the second template fuse unit 1402 may be computed by directly taking values from the NRAM 431. If the available space of the NRAM 431 is not large enough, the processing apparatus 203 further judges whether the available space of the SRAM 308 is large enough. If the available space of the SRAM 308 is large enough, the two computing results are stored in the SRAM 308, and values may be directly taken from the SRAM 308 when the template fuse unit 1402 is computed.

Since these two computing results are on-chip unit maps of the second template fuse unit 1402, the computing apparatus 201 is not required to load the on-chip unit maps from the DRAM 204 when computing the second template fuse unit 1402, but directly reads values from the NRAM 431 or the SRAM 308 for computing, thereby reducing on-chip and off-chip accesses.

If both the available space of the NRAM 431 and the available space of the SRAM 308 are not large enough, the computing apparatus 201 saves the two computing results generated by the first template fuse unit 1401 back to the DRAM 204. When computing the second template fuse unit 1402, the computing apparatus 201 loads these two computing results from the DRAM 204 for computing.

When deriving the shape of the second template fuse unit 1402, the processing apparatus 203 judges whether the second template fuse unit 1402 includes the ending point of the branch structure. The second template fuse unit 1402 does include layer T10, so, when the processing apparatus 203 derives the address, the computing apparatus 201 saves computing results generated by the second template fuse unit 1402 back to the DRAM 204.

To sum up, the processing apparatus 203 of this embodiment converts the branch structure into the long-chain structure. The long-chain structure is simple and is easy to generate the template fuse unit. Then, the long-chain structure is restored to the branch structure for shape and address derivation, and it is no longer necessary to perform the fusion in units of the entire branch structure. The computing apparatus 201 performs neural network computing according to the template fuse unit.

Figure 16:
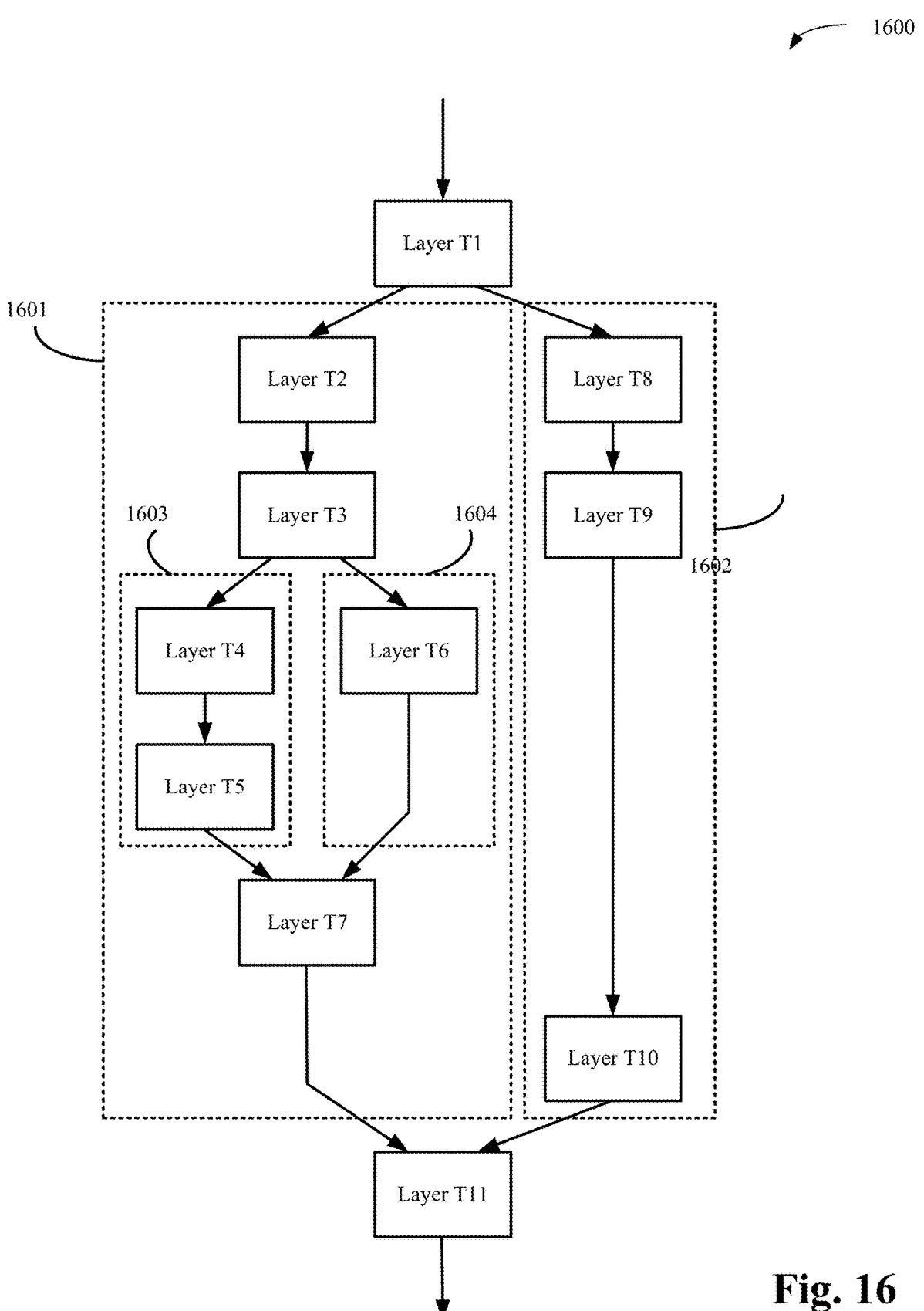
FIG. 16 is another exemplary neural network model fragment.

Another embodiment of the present disclosure is also an apparatus for fusing a branch structure. The apparatus also has the structure shown in FIGS. 1 to 4. Different from the branch structure in FIG. 15, this embodiment may fuse a branch structure with sub-branches. FIG. 16 is an exemplary neural network model fragment, which includes a branch structure 1600. A starting point of the branch structure 1600 is layer T1, and an ending point of the branch structure 1600 is layer T11. From layer T1, there are a first branch 1601 and a second branch 1602. The first branch 1601 includes layers T2 to T7, and the second branch 1602 includes layers T8 to T10. The first branch 1601 includes a sub-branch structure. A starting point of the sub-branch structure is layer T3, and an ending point of the sub-branch structure is layer T7. A first sub-branch 1603 includes layer T4 and layer T5, and a second sub-branch 1604 includes layer T6.

When fusing the branch structure 1600, the processing apparatus 203 first creates a topological sequence for the branch structure 1600. The processing apparatus 203 first identifies the starting point and the ending point of the branch structure 1600; in other words, the starting point is layer T1, and the ending point is layer T11. The processing apparatus 203 sets the starting point of the branch structure 1600 as a starting point of the topological sequence, and the starting point of the branch structure 1600 is also set as the starting layer of the template fuse unit. Moreover, the processing apparatus 203 sets the ending point of the branch structure 1600 as an ending point of the topological sequence. The processing apparatus 203 further judges whether the branch structure 1600 has the sub-branch structure. The branch structure 1600 does have the sub-branch structure. The processing apparatus 203 first identifies a starting point and an ending point of the sub-branch structure, which are layer T3 and layer T7 respectively. Then, the processing apparatus 203 arranges the starting point, the ending point, and each layer in the middle of the sub-branch structure according to the topological sequence. There are two ways of arrangement.

The first arrangement is to compare the numbers of layers of sub-branches in the sub-branch structure and then arrange each layer of the sub-branches in a descending order of the numbers of layers. The first sub-branch 1603 has two layers, and the second sub-branch 1604 has one layer. The number of layers of the first sub-branch 1603 is more, so each layer in the first sub-branch 1603 is arranged before each layer in the second sub-branch 1604. Based on this arrangement, a topological sequence of the sub-branch structure is layer T3→layer T4→layer T5→layer T6→layer T7.

The second arrangement is to compare the numbers of layers of the sub-branches in the sub-branch structure and then arrange each layer of the sub-branches in an ascending order of the numbers of layers. The number of layers of the second sub-branch 1604 is less, so each layer in the second sub-branch 1604 is arranged before each layer in the first sub-branch 1603. Based on this arrangement, the topological sequence of the sub-branch structure is layer T3→layer T6→layer T4→layer T5→layer T7.

Figure 17:
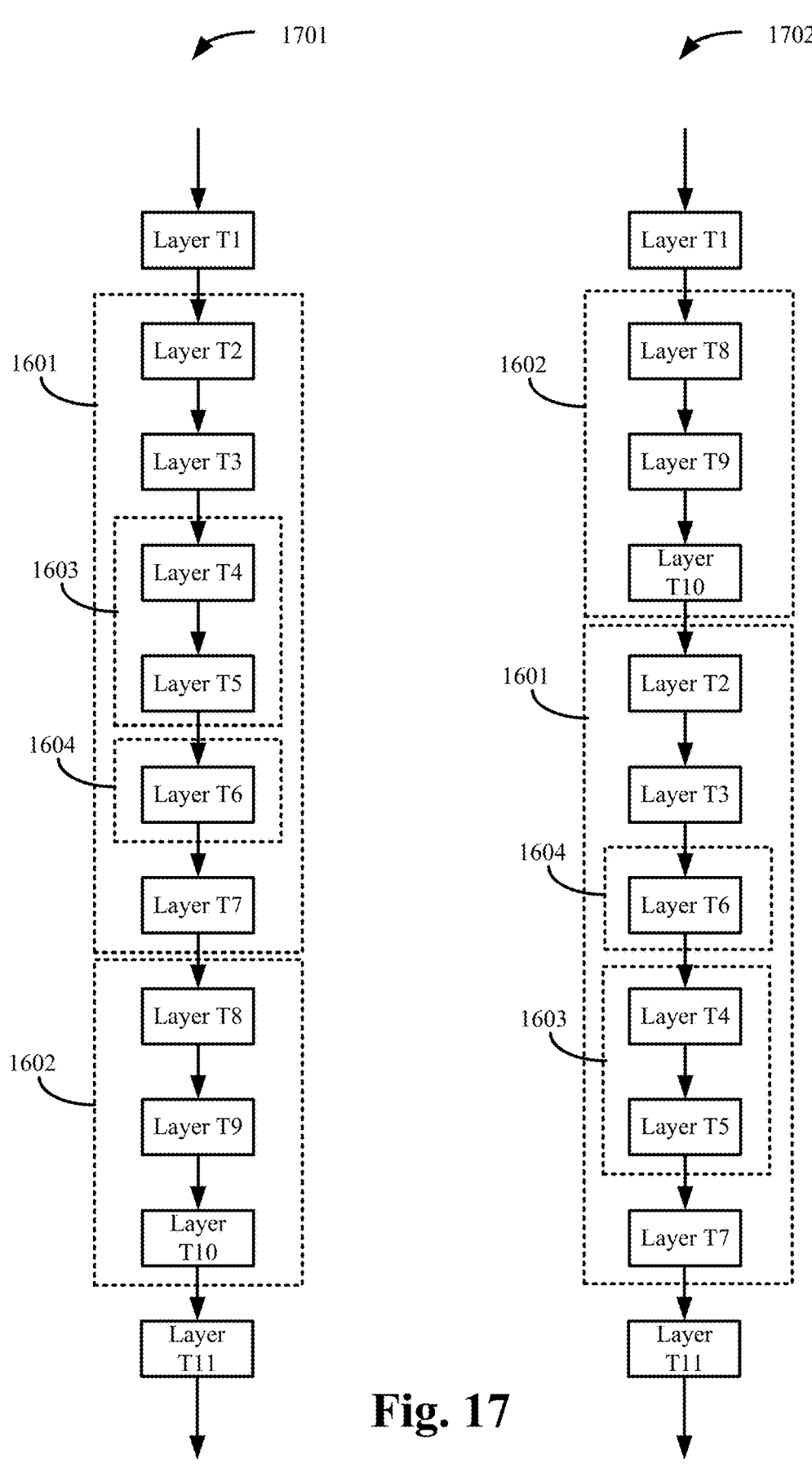
FIG. 17 is a schematic diagram of a topological sequence of a branch structure according to another embodiment of the present disclosure.

After processing the topological sequence of the sub-branch structure, the processing apparatus 203 continues to sort the branch structure 1600. In this embodiment, the branch structure 1600 is sorted in the same way as the sub-branch structure. In other words, if the sub-branches adopt the first arrangement (in the descending order of the numbers of layers), then the branch structure 1600 is also arranged in the descending order of the numbers of layers. The number of layers of the first branch 1601 is more than that of the second branch 1602, so each layer of the first branch 1601 is arranged before each layer of the second branch 1602, thus generating a long-chain structure 1701 shown in FIG. 17. If the sub-branches adopt the second arrangement (in the ascending order of the numbers of layers), then each layer of the second branch 1602 of the branch structure 1600 is arranged before each layer of the first branch 1601, thus generating a long-chain structure 1702 shown in FIG. 17.

Next, the processing apparatus 203 replaces the branch structure 1600 with the long-chain structure 1701 or the long-chain structure 1702, adds or deletes the template fuse unit in units of layers in the topological sequence, and checks rules in the fusion policy to create the template fuse unit. Similarly, in this embodiment, it is not necessary for the template fuse unit to include the entire branch structure 1601 or the entire branch structure 1602.

In order to make data moving more efficient, when deriving the shape of the template fuse unit of the branch structure 1601 or the branch structure 1602, the processing apparatus 203 judges whether the template fuse unit includes the ending point of the branch structure or the sub-branch structure. If the template fuse unit does not include the ending point of the branch structure or the sub-branch structure, the processing apparatus 203 further judges whether the available space of the NRAM 431 is large enough. If the available space of the NRAM 431 is large enough, when the processing apparatus 203 derives the address, the computing apparatus 201 stores intermediate results of the last layer generated by the template fuse unit to the NRAM 431. If the available space of the NRAM 431 is not large enough, the processing apparatus 203 further judges whether the available space of the SRAM 308 is large enough. If the available space of the SRAM 308 is large enough, the intermediate results of the last layer are stored in the SRAM 308, and values may be directly taken from the SRAM 308 when the template fuse unit is computed.

If the template fuse unit does not include the ending point of the branch structure or the sub-branches, it is represented that the output (the intermediate results of the last layer) of the template fuse unit is an on-chip unit map of a next template fuse unit. Therefore, the computing apparatus 201 is not required to load the on-chip unit map from the DRAM 204 when computing the next template fuse unit, but directly reads values from the NRAM 431 or the SRAM 308 for computing, thereby reducing on-chip and off-chip accesses.

However, if both the available space of the NRAM 431 and the available space of the SRAM 308 are not large enough, the intermediate results of the last layer of the template fuse unit are saved back to the DRAM 204. When computing the next template fuse unit, the computing apparatus 201 loads the intermediate results from the DRAM 204 for computing.

If the processing apparatus 203 judges that this template fuse unit includes the ending point of the branch structure 1600 or the sub-branches, when the processing apparatus 203 derives the address, the computing apparatus 201 saves the intermediate results of the last layer generated by this template fuse unit back to the DRAM 204.

Although this embodiment is illustrated by the branch structure including one sub-branch structure, those skilled in the art may easily infer the case of multiple sub-branches, which will not be detailed herein. The processing apparatus 203 of this embodiment converts the branch/sub-branch structure into the long-chain structure. The long-chain structure is simple and is easy to generate the template fuse unit. Then, the long-chain structure is restored to the branch structure for shape and address derivation. The computing apparatus 201 performs neural network computing according to the template fuse unit.

Figure 18:
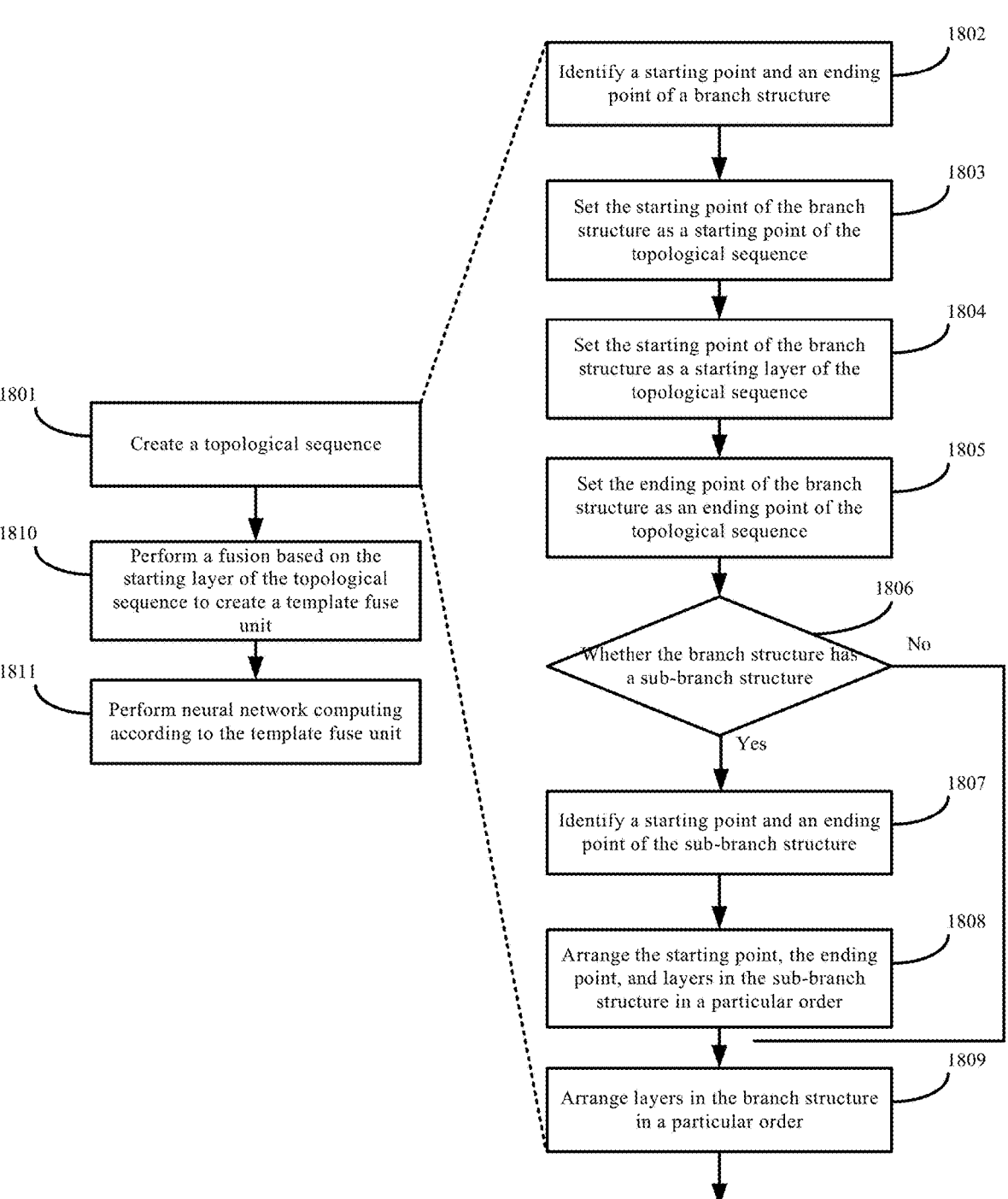
FIG. 18 is a flowchart of fusing a branch structure of a neural network according to another embodiment of the present disclosure.

Another embodiment of the present disclosure is a method for dynamically fusing a branch structure of a neural network according to a fusion policy. This embodiment fuses a branch structure with sub-branches by means of an apparatus with the structure shown in FIGS. 1 to 4. FIG. 18 is a flowchart of this embodiment.

In a step 1801, a topological sequence is created for a branch structure. This step is divided into following steps.

In a step 1802, a starting point and an ending point of the branch structure are identified. In a step 1803, the starting point of the branch structure is set as a starting point of the topological sequence. In a step 1804, the starting point is set as a starting layer of a template fuse unit. In a step 1805, the ending point of the branch structure is set as an ending point of the topological sequence. In a step 1806, whether the branch structure has a sub-branch structure is judged; if the branch structure has the sub-branch structure, a step 1807 is performed to identify a starting point and an ending point of the sub-branch structure. In a step 1808, the starting point, the ending point, and each layer in the middle of the sub-branch structure are arranged in a particular order. There are two ways of arrangement: comparing the numbers of layers of sub-branches in the sub-branch structure and then arranging each layer of the sub-branches in a descending order of the numbers of layers; and comparing the numbers of layers of the sub-branches in the sub-branch structure and then arranging each layer of the sub-branches in an ascending order of the numbers of layers. After the topological sort of the sub-branch structure is processed, or after it is judged that the branch structure does not have the sub-branch structure in the step 1806, a step 1809 is performed to sort each layer of the branch structure in a particular order. In this embodiment, the branch structure is sorted in the same way as the sub-branch structure. At this point, this embodiment converts the branch structure into a long-chain structure.

Next, a step 1810 is performed to replace the branch structure with the long-chain structure, add or delete the template fuse unit in units of layers in the topological sequence, and based on the starting layer set in the step 1804, check rules in the fusion policy to create the template fuse unit. This step is to replace the branch structure with the long-chain structure, and the step 1202 is performed. Related technical details will not be repeated herein.

When deriving the shape of the template fuse unit of the branch structure or the sub-branch structure, this embodiment judges whether the template fuse unit includes the ending point of the branch structure or the sub-branch structure. If the template fuse unit does not include the ending point of the branch structure or the sub-branch structure, this embodiment further judges whether the available space of the NRAM 431 is large enough. If the available space of the NRAM 431 is large enough, when this embodiment derives the address, the computing apparatus 201 stores intermediate results of the last layer generated by the template fuse unit to the NRAM 431. If the available space of the NRAM 431 is not large enough, whether the available space of the SRAM 308 is large enough is further judged. If the available space of the SRAM 308 is large enough, the intermediate results of the last layer are stored in the SRAM 308, and values may be directly taken from the SRAM 308 when the template fuse unit is computed.

However, if both the available space of the NRAM 431 and the available space of the SRAM 308 are not large enough, this embodiment saves the intermediate results of the last layer of the template fuse unit back to the DRAM 204. When a next template fuse unit is computed, the intermediate results are loaded from the DRAM 204 for computing.

If the template fuse unit includes the ending point of the branch structure or the sub-branch structure, when this embodiment derives the address, the computing apparatus 201 saves the intermediate results of the last layer generated by the template fuse unit back to the DRAM 204.

Finally, a step 1811 is performed to perform neural network computing according to the template fuse unit.

Another embodiment of the present disclosure is a computer readable storage medium, on which computer program codes for dynamically fusing a branch structure of a neural network according to a fusion policy are stored. When the computer program codes are run by a processor, the method described in the above embodiment is performed.

By setting the fusion policy, the present disclosure dynamically determines the template fuse unit, fuses the branch structure in the neural network to form a new self-defined layer, and loads data required for computing the template fuse unit at a time to reduce input/output overheads.

The foregoing may be better understood according to following articles:

2020115632669Article A1. An integrated circuit apparatus for fusing a neural network, where the neural network includes a regular pyramid layer, an input feature map of the regular pyramid layer is less than an output feature map of the regular pyramid layer, and input data in the input feature map generates at least one piece of output data in the output feature map, and the integrated circuit apparatus includes:

a processing apparatus, configured to:

set all output data corresponding to the same input data as a fusion block, where the output feature map includes a plurality of fusion blocks;

create a template fuse unit according to a fusion policy in units of fusion blocks; and a computing apparatus, configured to perform neural network computing according to the template fuse unit.

Article A2. The integrated circuit apparatus of article A1, where the computing apparatus includes a plurality of clusters, where each cluster includes a plurality of processor cores, and the fusion policy is to allocate the fusion block to each processor core in units of fusion blocks based on hardware resources of each processor core.

Article A3. The integrated circuit apparatus of article A2, where each cluster further includes a memory core, where the memory core includes a shared storage unit, and the fusion policy is to assign one of specific processor cores to compute a specific fusion block when the specific fusion block is computed repeatedly among the specific processor cores and store an intermediate result to the shared storage unit.

Article A4. The integrated circuit apparatus of article A3, where the memory core merges the intermediate result into intermediate results generated by other specific processor cores.

Article A5. The integrated circuit apparatus of article A3, where the shared storage unit includes cache space, the fusion policy is that a sum of storage space required by a weight of a next sub-map, storage space required by all the output data, and the cache space is not greater than available space of the shared storage unit, and when the processing apparatus judges that the fusion policy is not satisfied, the processing apparatus stops fusing the regular pyramid layer.

Article A6. The integrated circuit apparatus of article A2, where each processor core includes a weight storage unit, the fusion policy is that storage space required by a weight involved in the fusion block is not greater than available space of the weight storage unit, and when the processing apparatus judges that the fusion policy is not satisfied, the processing apparatus decreases the number of the fusion blocks.

Article A7. The integrated circuit apparatus of article A1, where the regular pyramid layer includes a deconvolution layer, an unpooling layer, or an unsampling layer.

Article A8. A board card, including the integrated circuit apparatus of any one of articles A1-A7.

Article A9. A method for fusing a neural network, where the neural network includes a regular pyramid layer, an input feature map of the regular pyramid layer is less than an output feature map of the regular pyramid layer, and input data in the input feature map generates at least one piece of output data in the output feature map, and the method includes:

setting all output data corresponding to the same input data as a fusion block, where the output feature map includes a plurality of fusion blocks;

creating a template fuse unit according to a fusion policy in units of fusion blocks; and performing neural network computing according to the template fuse unit.

Article A10. A computer readable storage medium, on which computer program codes for fusing a neural network are stored, where, when the computer program codes are run by a processing apparatus, the method of article A9 is performed.

According to different application scenarios, an electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph. The electronic device or apparatus of the present disclosure may also be applied to Internet, Internet of Things, data center, energy, transportation, public management, manufacturing, education, power grid, telecommunications, finance, retail, construction sites, medical, and other fields. Further, the electronic device or apparatus of the present disclosure may also be used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with hardware information of the terminal device and/or the edge device. As such, according to the hardware information of the terminal device and/or the edge device, appropriate hardware resources may be matched from hardware resources of the cloud device to simulate hardware resources of the terminal device and/or the edge device, so as to complete unified management, scheduling, and collaborative work of terminal-cloud integration or cloud-edge-terminal integration.

It is required to be explained that for the sake of brevity, the present disclosure describes some method embodiments as a series of actions and combinations thereof, but those skilled in the art may understand that the solution of the present disclosure is not limited by the order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as optional embodiments; in other words, actions and units involved thereof are not necessarily required for the implementation of a certain solution or some solutions of the present disclosure. Additionally, according to different solutions, descriptions of some embodiments of the present disclosure have their own emphases. In view of this, those skilled in the art may understand that, for a part that is not described in detail in a certain embodiment of the present disclosure, reference may be made to related descriptions in other embodiments.

For specific implementations, according to the present disclosure and under the teaching of the present disclosure, those skilled in the art may understand that several embodiments disclosed in the present disclosure may be implemented in other ways that are not disclosed in the present disclosure. For example, for units in the aforementioned electronic device or apparatus embodiment, the present disclosure divides the units on the basis of considering logical functions, but there may be other division methods during actual implementations. For another example, a plurality of units or components may be combined or integrated into another system, or some features or functions in the units or components may be selectively disabled. In terms of a connection between different units or components, the connection discussed above in combination with drawings may be direct or indirect coupling between the units or components. In some scenarios, the direct or indirect coupling relates to a communication connection using an interface, where the communication interface may support electrical, optical, acoustic, magnetic, or other forms of signal transmission.

In the present disclosure, units described as separate components may be or may not be physically separated. Components shown as units may be or may not be physical units. The components or units may be located in a same position or distributed to a plurality of network units.

Additionally, according to actual requirements, some or all of the units may be selected to achieve the purpose of the solution described in embodiments of the present disclosure. Additionally, in some scenarios, the plurality of units in the embodiments of the present disclosure may be integrated into one unit, or each of the units may be physically separated.

In some implementation scenarios, the integrated unit may be implemented in the form of a software program unit. If the integrated unit is implemented in the form of the software program unit and sold or used as an independent product, the integrated unit may be stored in a computer-readable memory. Based on this, when the solution of the present disclosure is embodied in the form of a software product (such as a computer-readable storage medium), the software product may be stored in a memory. The software product may include several instructions used to enable a computer device (such as a personal computer, a server, or a network device, and the like) to perform part or all of steps of the method of the embodiments of the present disclosure. The memory includes but is not limited to an USB, a flash disk, a read only memory (ROM), a random access memory (RAM), a mobile hard disk, a magnetic disk, or an optical disc, and other media that may store a program code.

In other implementation scenarios, the integrated unit may be implemented in the form of hardware. In other words, the integrated unit may be a specific hardware circuit, which may include a digital circuit and/or an analog circuit. A physical implementation of a hardware structure of the circuit includes but is not limited to a physical component. The physical component includes but is not limited to a transistor, or a memristor, and the like. In view of this, various apparatuses (such as the computing apparatus or other processing apparatus) described in the present disclosure may be implemented by an appropriate hardware processor, such as a central processing unit (CPU), a graphics processing unit (GPU), a field-programmable gate array (FPGA), a digital signal processor (DSP), and an application-specific integrated circuit (ASIC), and the like. Further, the aforementioned storage unit or the aforementioned storage apparatus may be any appropriate storage medium (including a magnetic storage medium or a magneto-optical storage medium, and the like), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), the ROM, and the RAM, and the like.

The embodiments of the present disclosure have been described in detail above. The present disclosure uses specific examples to explain principles and implementations of the present disclosure. The descriptions of the above embodiments are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

What is claimed:

1. An integrated circuit apparatus for dynamically fusing a branch structure of a neural network according to a fusion policy, comprising:
    a processing apparatus, configured to:
        create a topological sequence according to the branch structure; and perform a fusion based on a starting layer of the topological sequence and check rules of the fusion policy to create a template fuse unit; and a computing apparatus, configured to perform neural network computing according to the template fuse unit, wherein when creating the topological sequence, the processing apparatus is configured to identify a starting point and an ending point of the branch structure, and the processing apparatus sets the starting point of the branch structure as the starting layer of the topological sequence, and wherein the computing apparatus comprises a plurality of clusters, wherein each cluster comprises a plurality of processor cores, wherein each processor core comprises a neuron storage unit, and the processing apparatus is further configured to judge whether the template fuse unit comprises the ending point of the branch structure; and if the template fuse unit does not comprise the ending point of the branch structure, the computing apparatus stores an intermediate result of a last layer of each branch in the branch structure in the template fuse unit to the neuron storage unit.

2. The integrated circuit apparatus of claim 1, wherein when creating the topological sequence, the processing apparatus is further configured to:

set the starting point of the branch structure as a starting point of the topological sequence; and set the ending point of the branch structure as an ending point of the topological sequence.

3. The integrated circuit apparatus of claim 2, wherein when creating the topological sequence, the processing apparatus is further configured to:

judge whether the branch structure has a sub-branch structure; if the branch structure has the sub-branch structure, the processing apparatus is further configured to:

identify a starting point and an ending point of the sub-branch structure; and arrange the starting point, the ending point, and layers in the sub-branch structure in a particular order.

4. The integrated circuit apparatus of claim 3, wherein when arranging the starting point, the ending point, and the layers in the sub-branch structure in a particular order, the processing apparatus is further configured to:

compare the numbers of layers of sub-branches in the sub-branch structure; and arrange layers of the sub-branches in a descending order of the numbers of layers.

5. The integrated circuit apparatus of claim 3, wherein when arranging the starting point, the ending point, and the layers in the sub-branch structure in a particular order, the processing apparatus is further configured to:

compare the numbers of layers of sub-branches in the sub-branch structure; and arrange layers of the sub-branches in an ascending order of the numbers of layers.

6. The integrated circuit apparatus of claim 3, wherein the computing apparatus comprises a plurality of clusters, wherein each cluster comprises a shared storage unit, and the processing apparatus is further configured to judge whether the template fuse unit comprises the ending point of the sub-branch structure; and if the template fuse unit does not comprise the ending point of the sub-branch structure, the computing apparatus stores an intermediate result of a last layer of each sub-branch in the sub-branch structure in the template fuse unit to the shared storage unit.

7. The integrated circuit apparatus of claim 3, wherein the computing apparatus comprises a plurality of clusters, wherein each cluster comprises a plurality of processor cores, wherein each processing core comprises a neuron storage unit, and the processing apparatus is further configured to judge whether the template fuse unit comprises the ending point of the sub-branch structure; and if the template fuse unit does not comprise the ending point of the sub-branch structure, the computing apparatus stores an intermediate result of a last layer of each sub-branch in the sub-branch structure in the template fuse unit to the neuron storage unit.

8. The integrated circuit apparatus of claim 1, wherein the computing apparatus comprises a plurality of clusters, wherein each cluster comprises a shared storage unit, and the processing apparatus is further configured to judge whether the template fuse unit comprises the ending point of the branch structure; and if the template fuse unit does not comprise the ending point of the branch structure, the computing apparatus stores an intermediate result of a last layer of each branch in the branch structure in the template fuse unit to the shared storage unit.

9. The integrated circuit apparatus of claim 1, wherein the starting layer is a layer other than a convolution layer and a pooling layer.

10. The integrated circuit apparatus of claim 1, wherein the starting layer is a top unfused layer in the neural network.

11. The integrated circuit apparatus of claim 1, wherein the fusion policy is to add or delete the template fuse unit in units of layers in the topological sequence.

* * * * *